United States Patent
Huang et al.

(10) Patent No.: US 11,860,415 B2
(45) Date of Patent: Jan. 2, 2024

(54) INTEGRATED OPTICAL WAVEGUIDES, DIRECT-BONDED WAVEGUIDE INTERFACE JOINTS, OPTICAL ROUTING AND INTERCONNECTS

(71) Applicant: ADEIA SEMICONDUCTOR BONDING TECHNOLOGIES INC., San Jose, CA (US)

(72) Inventors: Shaowu Huang, Sunnyvale, CA (US); Javier A. Delacruz, San Jose, CA (US); Liang Wang, Newark, CA (US); Guilian Gao, San Jose, CA (US)

(73) Assignee: ADEIA SEMICONDUCTOR BONDING TECHNOLOGIES INC., San Jose, CA (US)

( * ) Notice: Subject to any disclaimer, the term of this patent is extended or adjusted under 35 U.S.C. 154(b) by 0 days.

(21) Appl. No.: 17/507,019

(22) Filed: Oct. 21, 2021

(65) Prior Publication Data

US 2022/0043209 A1 Feb. 10, 2022

Related U.S. Application Data

(62) Division of application No. 16/247,262, filed on Jan. 14, 2019, now Pat. No. 11,169,326.
(Continued)

(51) Int. Cl.
*G02B 6/13* (2006.01)
*G02B 6/12* (2006.01)

(52) U.S. Cl.
CPC ...... *G02B 6/13* (2013.01); *G02B 2006/12061* (2013.01); *G02B 2006/12097* (2013.01)

(58) Field of Classification Search
None
See application file for complete search history.

(56) References Cited

U.S. PATENT DOCUMENTS

| | | |
|---|---|---|
| 4,998,665 A | 3/1991 | Hayashi |
| 5,015,052 A | 5/1991 | Ridgway et al. |

(Continued)

FOREIGN PATENT DOCUMENTS

| | | |
|---|---|---|
| CN | 106206872 A | 12/2016 |
| EP | 1 441 410 B1 | 4/2006 |

(Continued)

OTHER PUBLICATIONS

Amirfeiz et al., "Formation of silicon structures by plasma-activated wafer bonding," Journal of The Electrochemical Society, 2000, vol. 147, No. 7, pp. 2693-2698.
(Continued)

*Primary Examiner* — Chad H Smith
(74) *Attorney, Agent, or Firm* — Knobbe, Martens, Olson & Bear, LLP

(57) ABSTRACT

Integrated optical waveguides, direct-bonded waveguide interface joints, optical routing and interconnects are provided. An example optical interconnect joins first and second optical conduits. A first direct oxide bond at room temperature joins outer claddings of the two optical conduits and a second direct bond joins the inner light-transmitting cores of the two conduits at an annealing temperature. The two low-temperature bonds allow photonics to coexist in an integrated circuit or microelectronics package without conventional high-temperatures detrimental to microelectronics. Direct-bonded square, rectangular, polygonal, and non-circular optical interfaces provide better matching with rectangular waveguides and better performance. Direct oxide-bonding processes can be applied to create running waveguides, photonic wires, and optical routing in an integrated circuit package or in chip-to-chip optical communications without need for conventional optical couplers. An example wafer-level process fabricates running waveguides, (Continued)

optical routing, and direct-bonded optical interconnects for silicon photonics and optoelectronics packages when two wafers are joined.

17 Claims, 8 Drawing Sheets

Related U.S. Application Data

(60) Provisional application No. 62/635,314, filed on Feb. 26, 2018.

(56) References Cited

U.S. PATENT DOCUMENTS

| | | |
|---|---|---|
| 5,087,585 A | 2/1992 | Hayashi |
| 5,225,797 A | 7/1993 | Schary et al. |
| 5,322,593 A | 6/1994 | Hasegawa et al. |
| 5,363,464 A | 11/1994 | Way et al. |
| 5,408,053 A | 4/1995 | Young |
| 5,471,090 A | 11/1995 | Deutsch et al. |
| 5,753,536 A | 5/1998 | Sugiyama et al. |
| 5,771,555 A | 6/1998 | Eda et al. |
| 5,785,874 A | 7/1998 | Eda |
| 5,818,631 A | 10/1998 | Askinazi et al. |
| 5,985,739 A | 11/1999 | Plettner et al. |
| 5,998,808 A | 12/1999 | Matsushita |
| 6,008,126 A | 12/1999 | Leedy |
| 6,080,640 A | 6/2000 | Gardner et al. |
| 6,084,714 A | 7/2000 | Ushiyama et al. |
| 6,108,472 A * | 8/2000 | Rickman .............. G02B 6/4214 257/E31.127 |
| 6,115,264 A | 9/2000 | Nosaka |
| 6,242,324 B1 | 6/2001 | Kub et al. |
| 6,265,775 B1 | 7/2001 | Seyyedy |
| 6,300,161 B1 | 10/2001 | Goetz et al. |
| 6,374,770 B1 | 4/2002 | Lee |
| 6,404,550 B1 | 6/2002 | Yajima |
| 6,418,029 B1 | 7/2002 | McKee et al. |
| 6,423,640 B1 | 7/2002 | Lee et al. |
| 6,429,532 B1 | 8/2002 | Han et al. |
| 6,442,321 B1 | 8/2002 | Berini |
| 6,465,892 B1 | 10/2002 | Suga |
| 6,614,960 B2 | 9/2003 | Berini |
| 6,638,808 B1 | 10/2003 | Ochi |
| 6,713,871 B2 | 3/2004 | Searls et al. |
| 6,759,692 B1 | 7/2004 | Ochi |
| 6,762,796 B1 | 7/2004 | Nakajoh et al. |
| 6,782,179 B2 | 8/2004 | Bozhevolnyi et al. |
| 6,801,691 B2 | 10/2004 | Berini |
| 6,868,258 B2 | 3/2005 | Hayata et al. |
| 6,887,769 B2 | 5/2005 | Kellar et al. |
| 6,908,027 B2 | 6/2005 | Tolchinsky et al. |
| 6,908,832 B2 | 6/2005 | Farrens et al. |
| 6,936,854 B2 | 8/2005 | Iwasaki et al. |
| 6,962,835 B2 | 11/2005 | Tong et al. |
| 7,010,183 B2 | 3/2006 | Estes et al. |
| 7,045,453 B2 | 5/2006 | Canaperi et al. |
| 7,078,811 B2 | 7/2006 | Suga |
| 7,105,980 B2 | 9/2006 | Abbott et al. |
| 7,126,212 B2 | 10/2006 | Enquist et al. |
| 7,193,423 B1 | 3/2007 | Dalton et al. |
| 7,339,798 B2 | 3/2008 | Chakravorty |
| 7,354,798 B2 | 4/2008 | Pogge et al. |
| 7,355,836 B2 | 4/2008 | Radhakrishnan et al. |
| 7,614,771 B2 | 11/2009 | McKechnie et al. |
| 7,626,216 B2 | 12/2009 | McKinzie, III |
| 7,705,691 B2 | 4/2010 | Lu et al. |
| 7,736,945 B2 | 6/2010 | Schiaffino et al. |
| 7,741,724 B2 | 6/2010 | Morikawa et al. |
| 7,746,663 B2 | 6/2010 | Hashimoto |
| 7,750,488 B2 | 7/2010 | Patti et al. |
| 7,791,429 B2 | 9/2010 | Chen et al. |
| 7,803,693 B2 | 9/2010 | Trezza |
| 8,009,763 B2 | 8/2011 | Risk et al. |
| 8,130,821 B2 | 3/2012 | Hopkins et al. |
| 8,153,505 B2 | 4/2012 | Tong et al. |
| 8,183,127 B2 | 5/2012 | Patti et al. |
| 8,211,722 B2 | 7/2012 | Lu |
| 8,241,961 B2 | 8/2012 | Kim et al. |
| 8,300,312 B2 | 10/2012 | Kobayashi et al. |
| 8,314,007 B2 | 11/2012 | Vaufredaz |
| 8,349,635 B1 | 1/2013 | Gan et al. |
| 8,357,931 B2 | 1/2013 | Schieck et al. |
| 8,377,798 B2 | 2/2013 | Peng et al. |
| 8,436,457 B2 | 5/2013 | Crisp et al. |
| 8,441,111 B2 | 5/2013 | Crisp et al. |
| 8,441,131 B2 | 5/2013 | Ryan |
| 8,476,146 B2 | 7/2013 | Chen et al. |
| 8,476,165 B2 | 7/2013 | Trickett et al. |
| 8,482,132 B2 | 7/2013 | Yang et al. |
| 8,483,253 B2 | 7/2013 | Budd et al. |
| 8,501,537 B2 | 8/2013 | Sadaka et al. |
| 8,524,533 B2 | 9/2013 | Tong et al. |
| 8,558,636 B2 | 10/2013 | Shin et al. |
| 8,620,164 B2 | 12/2013 | Heck et al. |
| 8,647,987 B2 | 2/2014 | Yang et al. |
| 8,697,493 B2 | 4/2014 | Sadaka |
| 8,698,323 B2 | 4/2014 | Mohammed et al. |
| 8,716,105 B2 | 5/2014 | Sadaka et al. |
| 8,802,538 B1 | 8/2014 | Liu |
| 8,809,123 B2 | 8/2014 | Liu et al. |
| 8,841,002 B2 | 9/2014 | Tong |
| 8,865,489 B2 | 10/2014 | Rogers et al. |
| 8,916,448 B2 | 12/2014 | Cheng et al. |
| 8,929,077 B2 | 1/2015 | Gouramanis |
| 8,988,299 B2 | 3/2015 | Kam et al. |
| 9,093,350 B2 | 7/2015 | Endo et al. |
| 9,142,517 B2 | 9/2015 | Liu |
| 9,171,756 B2 | 10/2015 | Enquist et al. |
| 9,179,584 B2 | 11/2015 | La Porta et al. |
| 9,184,125 B2 | 11/2015 | Enquist et al. |
| 9,224,704 B2 | 12/2015 | Landru |
| 9,230,941 B2 | 1/2016 | Chen et al. |
| 9,257,399 B2 | 2/2016 | Kuang et al. |
| 9,263,186 B2 | 2/2016 | Li et al. |
| 9,299,736 B2 | 3/2016 | Chen et al. |
| 9,312,229 B2 | 4/2016 | Chen et al. |
| 9,331,149 B2 | 5/2016 | Tong et al. |
| 9,337,235 B2 | 5/2016 | Chen et al. |
| 9,368,866 B2 | 6/2016 | Yu |
| 9,385,024 B2 | 7/2016 | Tong et al. |
| 9,391,143 B2 | 7/2016 | Tong et al. |
| 9,394,161 B2 | 7/2016 | Cheng et al. |
| 9,431,368 B2 | 8/2016 | Enquist et al. |
| 9,434,145 B2 | 9/2016 | Erdogan et al. |
| 9,437,572 B2 | 9/2016 | Chen et al. |
| 9,443,796 B2 | 9/2016 | Chou et al. |
| 9,461,007 B2 | 10/2016 | Chun et al. |
| 9,496,202 B2 | 11/2016 | Hashimoto |
| 9,496,239 B1 | 11/2016 | Edelstein et al. |
| 9,536,848 B2 | 1/2017 | England et al. |
| 9,537,199 B2 | 1/2017 | Dang et al. |
| 9,559,081 B1 | 1/2017 | Lai et al. |
| 9,620,481 B2 | 4/2017 | Edelstein et al. |
| 9,625,713 B2 | 4/2017 | Helie et al. |
| 9,656,852 B2 | 5/2017 | Cheng et al. |
| 9,671,572 B2 | 6/2017 | Decker et al. |
| 9,711,694 B2 | 7/2017 | Robin et al. |
| 9,723,716 B2 | 8/2017 | Meinhold |
| 9,728,521 B2 | 8/2017 | Tsai et al. |
| 9,741,620 B2 | 8/2017 | Uzoh et al. |
| 9,744,754 B2 | 8/2017 | Wakamatsu et al. |
| 9,799,587 B2 | 10/2017 | Fujii et al. |
| 9,847,458 B2 | 12/2017 | Lee et al. |
| 9,852,988 B2 | 12/2017 | Enquist et al. |
| 9,881,882 B2 | 1/2018 | Hsu et al. |
| 9,893,004 B2 | 2/2018 | Yazdani |
| 9,899,442 B2 | 2/2018 | Katkar |
| 9,929,050 B2 | 3/2018 | Lin |
| 9,935,088 B2 | 4/2018 | Budd et al. |
| 9,941,241 B2 | 4/2018 | Edelstein et al. |
| 9,941,243 B2 | 4/2018 | Kim et al. |
| 9,953,941 B2 | 4/2018 | Enquist |

(56) References Cited

U.S. PATENT DOCUMENTS

| | | |
|---|---|---|
| 9,960,142 B2 | 5/2018 | Chen et al. |
| 9,960,152 B2 | 5/2018 | Bono et al. |
| 10,002,844 B1 | 6/2018 | Wang et al. |
| 10,026,605 B2 | 7/2018 | Doub et al. |
| 10,075,657 B2 | 9/2018 | Fahim et al. |
| 10,204,893 B2 | 2/2019 | Uzoh et al. |
| 10,269,756 B2 | 4/2019 | Uzoh |
| 10,276,619 B2 | 4/2019 | Kao et al. |
| 10,276,909 B2 | 4/2019 | Huang et al. |
| 10,418,277 B2 | 9/2019 | Cheng et al. |
| 10,446,487 B2 | 10/2019 | Huang et al. |
| 10,446,532 B2 | 10/2019 | Uzoh et al. |
| 10,475,778 B2 | 11/2019 | Pfeuffer et al. |
| 10,508,030 B2 | 12/2019 | Katkar et al. |
| 10,522,499 B2 | 12/2019 | Enquist et al. |
| 10,571,699 B1 | 2/2020 | Parsons et al. |
| 10,707,087 B2 | 7/2020 | Uzoh et al. |
| 10,784,191 B2 | 9/2020 | Huang et al. |
| 10,790,262 B2 | 9/2020 | Uzoh et al. |
| 10,840,135 B2 | 11/2020 | Uzoh |
| 10,840,205 B2 | 11/2020 | Fountain, Jr. et al. |
| 10,854,578 B2 | 12/2020 | Morein |
| 10,879,212 B2 | 12/2020 | Uzoh et al. |
| 10,886,177 B2 | 1/2021 | DeLaCruz et al. |
| 10,892,246 B2 | 1/2021 | Uzoh |
| 10,923,408 B2 | 2/2021 | Huang et al. |
| 10,923,413 B2 | 2/2021 | DeLaCruz |
| 10,950,547 B2 | 3/2021 | Mohammed et al. |
| 10,964,664 B2 | 3/2021 | Mandalapu et al. |
| 10,985,133 B2 | 4/2021 | Uzoh |
| 10,991,804 B2 | 4/2021 | DeLaCruz et al. |
| 10,998,292 B2 | 5/2021 | Lee et al. |
| 11,004,757 B2 | 5/2021 | Katkar et al. |
| 11,011,494 B2 | 5/2021 | Gao et al. |
| 11,011,503 B2 | 5/2021 | Wang et al. |
| 11,031,285 B2 | 6/2021 | Katkar et al. |
| 11,056,348 B2 | 7/2021 | Theil |
| 11,088,099 B2 | 8/2021 | Katkar et al. |
| 11,127,738 B2 | 9/2021 | DeLaCruz et al. |
| 11,158,606 B2 | 10/2021 | Gao et al. |
| 11,171,117 B2 | 11/2021 | Gao et al. |
| 11,176,450 B2 | 11/2021 | Teig et al. |
| 11,256,004 B2 | 2/2022 | Haba et al. |
| 11,264,357 B1 | 3/2022 | DeLaCruz et al. |
| 11,276,676 B2 | 3/2022 | Enquist et al. |
| 11,296,044 B2 | 4/2022 | Gao et al. |
| 11,329,034 B2 | 5/2022 | Tao et al. |
| 11,348,898 B2 | 5/2022 | DeLaCruz et al. |
| 11,355,443 B2 | 6/2022 | Huang et al. |
| 2002/0000328 A1 | 1/2002 | Motomura et al. |
| 2002/0003307 A1 | 1/2002 | Suga |
| 2002/0025101 A1* | 2/2002 | Kaatz ............... G02B 6/12004 385/14 |
| 2002/0131715 A1* | 9/2002 | Brady .............. G02B 6/4236 385/95 |
| 2003/0081906 A1 | 5/2003 | Filhaber et al. |
| 2003/0168716 A1 | 9/2003 | Lee et al. |
| 2004/0071424 A1 | 4/2004 | Hiraka et al. |
| 2004/0084414 A1 | 5/2004 | Sakai et al. |
| 2004/0149991 A1 | 8/2004 | Won |
| 2004/0155692 A1 | 8/2004 | Ochi |
| 2004/0157407 A1 | 8/2004 | Tong et al. |
| 2004/0207043 A1 | 10/2004 | Matsunaga et al. |
| 2004/0226910 A1 | 11/2004 | Chatterjee et al. |
| 2005/0063134 A1 | 3/2005 | Kim et al. |
| 2005/0063437 A1 | 3/2005 | Horng et al. |
| 2005/0135041 A1 | 6/2005 | Kang et al. |
| 2005/0190808 A1 | 9/2005 | Yonekura et al. |
| 2005/0226299 A1 | 10/2005 | Horng et al. |
| 2005/0231303 A1 | 10/2005 | Chang et al. |
| 2006/0012966 A1 | 1/2006 | Chakravorty |
| 2006/0017144 A1 | 1/2006 | Uematsu et al. |
| 2006/0057945 A1 | 3/2006 | Hsu et al. |
| 2006/0145778 A1 | 7/2006 | Pleva et al. |
| 2007/0045814 A1 | 3/2007 | Yamamoto et al. |
| 2007/0085165 A1 | 4/2007 | Oh et al. |
| 2007/0096130 A1 | 5/2007 | Schiaffino et al. |
| 2007/0096294 A1 | 5/2007 | Ikeda et al. |
| 2007/0111386 A1 | 5/2007 | Kim et al. |
| 2007/0147014 A1 | 6/2007 | Chang et al. |
| 2007/0222048 A1 | 9/2007 | Huang |
| 2007/0295456 A1 | 12/2007 | Gudeman et al. |
| 2008/0124835 A1 | 5/2008 | Chen et al. |
| 2008/0150821 A1 | 6/2008 | Koch et al. |
| 2009/0009103 A1 | 1/2009 | McKechnie et al. |
| 2009/0052827 A1 | 2/2009 | Durfee et al. |
| 2009/0165854 A1 | 7/2009 | Yamazaki et al. |
| 2009/0206962 A1 | 8/2009 | Chou et al. |
| 2009/0242252 A1 | 10/2009 | Tanaka |
| 2010/0317132 A1 | 12/2010 | Rogers et al. |
| 2011/0018657 A1 | 1/2011 | Cheng et al. |
| 2011/0024918 A1 | 2/2011 | Brunnbauer et al. |
| 2011/0059275 A1 | 3/2011 | Stark |
| 2011/0113828 A1 | 5/2011 | Matsumoto |
| 2011/0115579 A1 | 5/2011 | Rofougaran |
| 2011/0165707 A1 | 7/2011 | Lott et al. |
| 2011/0290552 A1 | 12/2011 | Palmateer et al. |
| 2011/0294242 A1 | 12/2011 | Lu |
| 2012/0013013 A1 | 1/2012 | Sadaka et al. |
| 2012/0013499 A1 | 1/2012 | Hayata |
| 2012/0100318 A1 | 4/2012 | Danzl et al. |
| 2012/0147516 A1 | 6/2012 | Kim et al. |
| 2012/0168217 A1 | 7/2012 | Hsu et al. |
| 2012/0189317 A1 | 7/2012 | Heck et al. |
| 2012/0212384 A1 | 8/2012 | Kam et al. |
| 2013/0009183 A1 | 1/2013 | Han |
| 2013/0009325 A1 | 1/2013 | Mori et al. |
| 2013/0020666 A1 | 1/2013 | Smith |
| 2013/0063863 A1 | 3/2013 | Timler et al. |
| 2013/0072011 A1 | 3/2013 | Zhang et al. |
| 2013/0105943 A1 | 5/2013 | Lai et al. |
| 2013/0122617 A1 | 5/2013 | Lott et al. |
| 2013/0170145 A1 | 7/2013 | Gouramanis |
| 2013/0207234 A1 | 8/2013 | Ikeda et al. |
| 2013/0250430 A1 | 9/2013 | Robbins et al. |
| 2013/0265733 A1 | 10/2013 | Herbsommer et al. |
| 2013/0286544 A1 | 10/2013 | Azais |
| 2014/0001568 A1 | 1/2014 | Wang et al. |
| 2014/0048908 A1 | 2/2014 | Chen et al. |
| 2014/0071519 A1 | 3/2014 | Chen et al. |
| 2014/0116761 A1 | 5/2014 | Lee et al. |
| 2014/0145338 A1 | 5/2014 | Fujii et al. |
| 2014/0175629 A1 | 6/2014 | Sun et al. |
| 2014/0175655 A1 | 6/2014 | Chen et al. |
| 2014/0177189 A1 | 6/2014 | Liu et al. |
| 2014/0184351 A1 | 7/2014 | Bae et al. |
| 2014/0225795 A1 | 8/2014 | Yu |
| 2014/0252635 A1 | 9/2014 | Tran et al. |
| 2014/0264751 A1 | 9/2014 | Chen et al. |
| 2014/0264948 A1 | 9/2014 | Chou et al. |
| 2014/0294342 A1 | 10/2014 | Offriein et al. |
| 2014/0370658 A1 | 12/2014 | Tong et al. |
| 2014/0377946 A1 | 12/2014 | Cha et al. |
| 2015/0021626 A1 | 1/2015 | Nakamura et al. |
| 2015/0064498 A1 | 3/2015 | Tong |
| 2015/0097298 A1 | 4/2015 | Chen et al. |
| 2015/0179539 A1 | 6/2015 | Tamai |
| 2015/0194379 A1 | 7/2015 | Chen et al. |
| 2015/0206902 A1 | 7/2015 | Cheng et al. |
| 2015/0221571 A1 | 8/2015 | Chaparala et al. |
| 2015/0235952 A1 | 8/2015 | Pan et al. |
| 2015/0270209 A1 | 9/2015 | Woychik et al. |
| 2015/0318618 A1 | 11/2015 | Chen et al. |
| 2015/0328875 A1 | 11/2015 | Hattori et al. |
| 2016/0027765 A1 | 1/2016 | von Malm et al. |
| 2016/0070078 A1* | 3/2016 | Budd ................. G02B 6/43 438/69 |
| 2016/0077294 A1 | 3/2016 | Jou et al. |
| 2016/0111404 A1 | 4/2016 | Sanders et al. |
| 2016/0141469 A1 | 5/2016 | Robin et al. |
| 2016/0155677 A1 | 6/2016 | Bonart et al. |
| 2016/0181477 A1 | 6/2016 | Lee et al. |
| 2016/0197630 A1 | 7/2016 | Kawasaki |
| 2016/0233195 A1 | 8/2016 | Nagai |

(56) References Cited

U.S. PATENT DOCUMENTS

| | | |
|---|---|---|
| 2016/0254345 A1 | 9/2016 | Singh et al. |
| 2016/0291265 A1 | 10/2016 | Kinghorn et al. |
| 2016/0309578 A1 | 10/2016 | Park |
| 2016/0343682 A1 | 11/2016 | Kawasaki |
| 2016/0372449 A1 | 12/2016 | Rusu et al. |
| 2017/0019086 A1 | 1/2017 | Dueweke |
| 2017/0047312 A1 | 2/2017 | Budd et al. |
| 2017/0062409 A1 | 3/2017 | Basker et al. |
| 2017/0148777 A1 | 5/2017 | Bono et al. |
| 2017/0179029 A1 | 6/2017 | Enquist et al. |
| 2017/0186670 A1 | 6/2017 | Budd et al. |
| 2017/0186730 A1 | 6/2017 | Shen et al. |
| 2017/0194271 A1 | 7/2017 | Hsu et al. |
| 2017/0207600 A1* | 7/2017 | Klamkin ............... H01S 5/141 |
| 2017/0315299 A1 | 11/2017 | Mathai et al. |
| 2017/0330858 A1 | 11/2017 | Lee et al. |
| 2017/0331050 A1 | 11/2017 | Yagi et al. |
| 2017/0338214 A1 | 11/2017 | Uzoh et al. |
| 2017/0343498 A1 | 11/2017 | Kalnitsky et al. |
| 2018/0120568 A1 | 5/2018 | Miller et al. |
| 2018/0156965 A1 | 6/2018 | El-Ghoroury et al. |
| 2018/0175012 A1 | 6/2018 | Wu et al. |
| 2018/0182639 A1 | 6/2018 | Uzoh et al. |
| 2018/0182666 A1 | 6/2018 | Uzoh et al. |
| 2018/0190580 A1 | 7/2018 | Haba et al. |
| 2018/0190583 A1 | 7/2018 | DeLaCruz et al. |
| 2018/0191047 A1 | 7/2018 | Huang et al. |
| 2018/0219038 A1 | 8/2018 | Gambino et al. |
| 2018/0261645 A1 | 9/2018 | Na et al. |
| 2018/0277523 A1 | 9/2018 | Ahmed et al. |
| 2018/0286805 A1 | 10/2018 | Huang et al. |
| 2018/0323177 A1 | 11/2018 | Yu et al. |
| 2018/0323227 A1 | 11/2018 | Zhang et al. |
| 2018/0331000 A1 | 11/2018 | DeLaCruz et al. |
| 2018/0331066 A1 | 11/2018 | Uzoh et al. |
| 2018/0358332 A1 | 12/2018 | Kim |
| 2019/0018245 A1 | 1/2019 | Cheng et al. |
| 2019/0088633 A1 | 3/2019 | Tao et al. |
| 2019/0096741 A1 | 3/2019 | Uzoh et al. |
| 2019/0115277 A1 | 4/2019 | Yu et al. |
| 2019/0131277 A1 | 5/2019 | Yang et al. |
| 2019/0198409 A1 | 6/2019 | Katkar et al. |
| 2019/0227320 A1 | 7/2019 | Bonar et al. |
| 2019/0265411 A1 | 8/2019 | Huang et al. |
| 2019/0309936 A1 | 10/2019 | Kondo et al. |
| 2019/0333550 A1 | 10/2019 | Fisch |
| 2019/0385935 A1 | 12/2019 | Gao et al. |
| 2019/0385966 A1 | 12/2019 | Gao et al. |
| 2020/0013637 A1 | 1/2020 | Haba |
| 2020/0013765 A1 | 1/2020 | Fountain, Jr. et al. |
| 2020/0035641 A1 | 1/2020 | Fountain, Jr. et al. |
| 2020/0043817 A1 | 2/2020 | Shen et al. |
| 2020/0075553 A1 | 3/2020 | DeLaCruz et al. |
| 2020/0118973 A1 | 4/2020 | Wang et al. |
| 2020/0126906 A1 | 4/2020 | Uzoh et al. |
| 2020/0194396 A1 | 6/2020 | Uzoh |
| 2020/0194614 A1 | 6/2020 | Pares |
| 2020/0194635 A1 | 6/2020 | Yuasa et al. |
| 2020/0227367 A1 | 7/2020 | Haba et al. |
| 2020/0235085 A1 | 7/2020 | Tao et al. |
| 2020/0243380 A1 | 7/2020 | Uzoh et al. |
| 2020/0279821 A1 | 9/2020 | Haba et al. |
| 2020/0294908 A1 | 9/2020 | Haba et al. |
| 2020/0321307 A1 | 10/2020 | Uzoh |
| 2020/0328162 A1 | 10/2020 | Haba et al. |
| 2020/0328164 A1 | 10/2020 | DeLaCruz et al. |
| 2020/0328165 A1 | 10/2020 | DeLaCruz et al. |
| 2020/0335408 A1 | 10/2020 | Gao et al. |
| 2020/0365575 A1 | 11/2020 | Uzoh et al. |
| 2020/0371154 A1 | 11/2020 | DeLaCruz et al. |
| 2020/0395321 A1 | 12/2020 | Katkar et al. |
| 2020/0411483 A1 | 12/2020 | Uzoh et al. |
| 2020/0411587 A1 | 12/2020 | Pezeshki et al. |
| 2021/0098412 A1 | 4/2021 | Haba et al. |
| 2021/0118864 A1 | 4/2021 | DeLaCruz et al. |
| 2021/0143125 A1 | 5/2021 | DeLaCruz et al. |
| 2021/0181510 A1 | 6/2021 | Katkar et al. |
| 2021/0193603 A1 | 6/2021 | Katkar et al. |
| 2021/0193624 A1 | 6/2021 | DeLaCruz et al. |
| 2021/0193625 A1 | 6/2021 | DeLaCruz et al. |
| 2021/0242152 A1 | 8/2021 | Fountain, Jr. et al. |
| 2021/0265331 A1 | 8/2021 | Wang et al. |
| 2021/0288037 A1 | 9/2021 | Tao et al. |
| 2021/0296282 A1 | 9/2021 | Gao et al. |
| 2021/0305202 A1 | 9/2021 | Uzoh et al. |
| 2021/0366820 A1 | 11/2021 | Uzoh |
| 2021/0407941 A1 | 12/2021 | Haba |
| 2022/0077063 A1 | 3/2022 | Haba |
| 2022/0077087 A1 | 3/2022 | Haba |
| 2022/0139867 A1 | 5/2022 | Uzoh |
| 2022/0139869 A1 | 5/2022 | Gao et al. |
| 2022/0155490 A1 | 5/2022 | Haba et al. |
| 2022/0208650 A1 | 6/2022 | Gao et al. |
| 2022/0208702 A1 | 6/2022 | Uzoh |
| 2022/0208723 A1 | 6/2022 | Katkar et al. |
| 2022/0246497 A1 | 8/2022 | Fountain, Jr. et al. |
| 2022/0285303 A1 | 9/2022 | Mirkarimi et al. |
| 2022/0319901 A1 | 10/2022 | Suwito et al. |
| 2022/0320035 A1 | 10/2022 | Uzoh et al. |
| 2022/0320036 A1 | 10/2022 | Gao et al. |
| 2023/0005850 A1 | 1/2023 | Fountain, Jr. |
| 2023/0019869 A1 | 1/2023 | Mirkarimi et al. |
| 2023/0036441 A1 | 2/2023 | Haba et al. |
| 2023/0067677 A1 | 3/2023 | Lee et al. |
| 2023/0069183 A1 | 3/2023 | Haba |
| 2023/0100032 A1 | 3/2023 | Haba et al. |
| 2023/0115122 A1 | 4/2023 | Uzoh et al. |
| 2023/0122531 A1 | 4/2023 | Uzoh |
| 2023/0123423 A1 | 4/2023 | Gao et al. |
| 2023/0125395 A1 | 4/2023 | Gao et al. |
| 2023/0130259 A1 | 4/2023 | Haba et al. |
| 2023/0132632 A1 | 5/2023 | Katkar et al. |
| 2023/0140107 A1 | 5/2023 | Uzoh et al. |
| 2023/0142680 A1 | 5/2023 | Guevara et al. |
| 2023/0154816 A1 | 5/2023 | Haba et al. |
| 2023/0154828 A1 | 5/2023 | Haba et al. |
| 2023/0187264 A1 | 6/2023 | Uzoh et al. |
| 2023/0187317 A1 | 6/2023 | Uzoh |
| 2023/0187412 A1 | 6/2023 | Gao et al. |
| 2023/0197453 A1 | 6/2023 | Fountain, Jr. et al. |
| 2023/0197496 A1 | 6/2023 | Theil |
| 2023/0197559 A1 | 6/2023 | Haba et al. |
| 2023/0197560 A1 | 6/2023 | Katkar et al. |
| 2023/0197655 A1 | 6/2023 | Theil et al. |
| 2023/0207402 A1 | 6/2023 | Fountain, Jr. et al. |
| 2023/0207437 A1 | 6/2023 | Haba |
| 2023/0207474 A1 | 6/2023 | Uzoh et al. |
| 2023/0207514 A1 | 6/2023 | Gao et al. |
| 2023/0215836 A1 | 7/2023 | Haba et al. |
| 2023/0245950 A1 | 8/2023 | Haba et al. |
| 2023/0268300 A1 | 8/2023 | Uzoh et al. |
| 2023/0317703 A1 | 10/2023 | Tao et al. |
| 2023/0343734 A1 | 10/2023 | Uzoh et al. |

FOREIGN PATENT DOCUMENTS

| | | | |
|---|---|---|---|
| JP | 60-257413 A | 12/1985 | |
| JP | 10-189671 A | 7/1998 | |
| JP | 2000-100679 | 4/2000 | |
| JP | 2001-102479 | 4/2001 | |
| JP | 2002-353416 | 12/2002 | |
| JP | 2003-043281 | 2/2003 | |
| JP | 2006-276313 A | 10/2006 | |
| JP | 2007-041117 | 2/2007 | |
| JP | 2008-258258 | 10/2008 | |
| JP | 2010-276940 | 12/2010 | |
| JP | 2013-33786 | 2/2013 | |
| JP | 2017-177519 | 10/2017 | |
| JP | 2018-160519 | 10/2018 | |
| KR | 10-2006-0105797 | 10/2006 | |
| KR | 10-2015-0097798 | 8/2015 | |
| WO | WO-02075387 A2 * | 9/2002 | ............ G02B 6/12 |
| WO | WO 2005/043584 A2 | 5/2005 | |
| WO | WO 2005/064646 A2 | 7/2005 | |

(56) References Cited

FOREIGN PATENT DOCUMENTS

| | | |
|---|---|---|
| WO | WO 2006/100444 A1 | 9/2006 |
| WO | WO 2012/125237 A2 | 9/2012 |
| WO | WO 2016/057259 A1 | 4/2016 |
| WO | WO 2017/089676 A1 | 6/2017 |
| WO | WO 2017/151442 A1 | 9/2017 |
| WO | WO 2018/223150 A1 | 12/2018 |

OTHER PUBLICATIONS

Chung et al., "Room temperature GaAseu + Si and InPeu + Si wafer direct bonding by the surface activate bonding method," Nuclear Instruments and Methods in Physics Research Section B: Beam Interactions with Materials and Atoms, Jan. 2, 1997, vol. 121, Issues 1-4, pp. 203-206.
Chung et al., "Wafer direct bonding of compound semiconductors and silicon at room temperature by the surface activated bonding method," Applied Surface Science, Jun. 2, 1997, vols. 117-118, pp. 808-812.
Farrens et al., "Chemical free room temperature wafer to wafer direct bonding," J. Electrochem. Soc., The Electrochemical Society, Inc., Nov. 1995, vol. 142, No. 11. pp. 3949-3955.
Farrens et al., "Chemical free wafer bonding of silicon to glass and sapphire," Electrochemical Society Proceedings vol. 95-7, 1995, pp. 72-77.
Gösele et al., "Semiconductor Wafer Bonding: A flexible approach to materials combinations in microelectronics; micromechanics and optoelectronics," IEEE, 1997, pp. 23-32.
Hosoda et al., "Effect of the surface treatment on the room-temperature bonding of Al to Si and SiO2," Journal of Materials Science, Jan. 1, 1998, vol. 33, Issue 1, pp. 253-258.
Hosoda et al., "Room temperature GaAs—Si and InP—Si wafer direct bonding by the surface activated bonding method," Nuclear Inst. And Methods in Physics Research B, 1997, vol. 121, Nos. 1-4, pp. 203-206.
Howlader et al., "A novel method for bonding of ionic wafers," Electronics Components and Technology Conference, 2006, IEEE, pp. 552-558.
Howlader et al., "Bonding of p-Si/n-InP wafers through surface activated bonding method at room temperature," Indium Phosphide and Related Materials, 2001, IEEE International Conference On, pp. 272-275.
Howlader et al., "Characterization of the bonding strength and interface current of p-Si/ n-InP wafers bonded by surface activated bonding method at room temperature," Journal of Applied Physics, Mar. 1, 2002, vol. 91, No. 5, pp. 3062-3066.
Howlader et al., "Investigation of the bonding strength and interface current of p-SionGaAs wafers bonded by surface activated bonding at room temperature," J. Vac. Sci. Technol. B 19, Nov./Dec. 2001, pp. 2114-2118.
Itoh et al., "Characteristics of fritting contacts utilized for micromachined wafer probe cards," 2000 American Institute of Physics, AIP Review of Scientific Instruments, vol. 71, 2000, pp. 2224.
Itoh et al., "Characteristics of low force contact process for MEMS probe cards," Sensors and Actuators A: Physical, Apr. 1, 2002, vols. 97-98, pp. 462-467.
Itoh et al., "Development of MEMS IC probe card utilizing fritting contact," Initiatives of Precision Engineering at the Beginning of a Millennium: 10th International Conference on Precision Engineering (ICPE) Jul. 18-20, 2001, Yokohama, Japan, 2002, Book Part 1, pp. 314-318.
Itoh et al., "Room temperature vacuum sealing using surface activated bonding method," The 12th International Conference on Solid State Sensors, Actuators and Microsystems, Boston, Jun. 8-12, 2003, 2003 IEEE, pp. 1828-1831.
Jeon, Y. et al., "Design of an on-interposer passive equalizer for high bandwidth memory (HBM) with 30Gbps data transmission," Electronic Components and Technology Conference (ECTC), 2016 IEEE 66th, Aug. 18, 2016.

Ker, Ming-Dou et al., "Fully process-compatible layout design on bond pad to improve wire bond reliability in CMOS Ics," IEEE Transactions on Components and Packaging Technologies, Jun. 2002, vol. 25, No. 2, pp. 309-316.
Kim et al., "Low temperature direct Cu—Cu bonding with low energy ion activation method," Electronic Materials and Packaging, 2001, IEEE, pp. 193-195.
Kim et al., "Room temperature Cu—Cu direct bonding using surface activated bonding method," J. Vac. Sci. Technol., 2003 American Vacuum Society, Mar./Apr. 2003, vol. 21, No. 2, pp. 449-453.
Kim et al., "Wafer-scale activated bonding of Cu—CU, Cu—Si, and Cu—SiO2 at low temperature," Proceedings—Electrochemical Society, 2003, vol. 19, pp. 239-247.
Kim, H. et al., "A wideband on-interposer passive equalizer design for chip-to-chip 30-Gb/s serial data transmission," IEEE Transactions on Components, Packaging and Manufacturing Technology, Jan. 2015, vol. 5, Issue 1, pp. 28-39.
Lee, H. et al., "Signal integrity of bump-less high-speed through silicon via channel for terabyte/s bandwidth 2.5D IC," 2016 IEEE 66th Electronic Components and Technology Conference, Aug. 18, 2016.
Matsuzawa et al., "Room-temperature interconnection of electroplated Au microbump by means of surface activated bonding method," Electornic Components and Technology Confererence, 2001, 51st Proceedings, IEEE, pp. 384-387.
Moriceau, H. et al., "Overview of recent direct wafer bonding advances and applications," Advances in Natural Sciences—Nanoscience and Nanotechnology, 2010, 11 pages.
Nakanishi, H. et al., "Studies on SiO2—SiO2 bonding with hydrofluoric acid. Room temperature and low stress bonding technique for MEMS," Sensors and Actuators, 2000, vol. 79, pp. 237-244.
Oberhammer, J. et al., "Sealing of adhesive bonded devices on wafer level," Sensors and Actuators A, 2004, vol. 110, No. 1-3, pp. 407-412, see pp. 407-412, and Figures 1(a)-1(l), 6 pages.
Onodera et al., "The effect of prebonding heat treatment on the separability of Au wire from Ag-plated Cu alloy substrate," Electronics Packaging Manufacturing, IEEE Transactions, Jan. 2002, vol. 25, Issue 1, pp. 5-12.
Plobi, A. et al., "Wafer direct bonding: tailoring adhesion between brittle materials," Materials Science and Engineering Review Journal, 1999, R25, 88 pages.
Reiche et al., "The effect of a plasma pretreatment on the Si/Si bonding behaviouir," Electrochemical Society Proceedings, 1998, vol. 97-36, pp. 437-444.
Roberds et al., "Low temperature , in situ, plasma activated wafer bonding," Electrochecmical Society Proceedings, 1997, vol. 97-36, pp. 598-606.
Shigetou et al., "Room temperature bonding of ultra-fine pitch and low-profiled Cu electrodes for bump-less interconnect," 2003 Electronic Components and Technology Conference, pp. 848-852.
Shigetou et al., "Room-temperature direct bonding of CMP-Cu film for bumpless interconnection," Electronic Components and Technology Confererence, 51st Proceedings, 2001, IEEE, pp. 755-760.
Shingo et al., "Design and fabrication of an electrostatically actuated MEMS probe card," Tranducers, Solid-State Sensors, Actuators and Microsystems, 12th International Conference, Jun. 8-12, 2003, vol. 2, pp. 1522-1525.
Suga et al., "A new approach to Cu—Cu direct bump bonding," IEMT/IMC Symposium, 1997, Joint International Electronic Manufacturing Symposium and the International Microelectronics Conference, Apr. 16-18, 1997, IEEE, pp. 146-151.
Suga et al., "A new bumping process using lead-free solder paste," Electronics Packaging Manufacturing, IEEE Transactions on (vol. 25, Issue 4), IEEE, Oct. 2002, pp. 253-256.
Suga et al., "A new wafer-bonder of ultra-high precision using surface activated bonding (SAB) concept," Electronic Components and Technology Conference, 2001, IEEE, pp. 1013-1018.
Suga et al., "Bump-less interconnect for next generation system packaging," Electronic Components and Technology Conference, 2001, IEEE, pp. 1003-1008.
Suga, T., "Feasibility of surface activated bonding for ultra-fine pitch interconnection—A new concept of bump-less direct bonding

(56) References Cited

OTHER PUBLICATIONS for system level packaging," The University of Tokyo, Research Center for Science and Technology, 2000 Electronic Components and Technology Conference, 2000 IEEE, pp. 702-705.

Suga, T., "Room-temperature bonding on metals and ceramics," Proceedings of the Second International Symposium on Semiconductor Wafer Bonding: Science, Technology and Applications, The Electrochemical Society Proceedings, vol. 93-29 (1993), pp. 71-80.

Suga et al., "Surface activated bonding—an approach to joining at room temperature," Ceramic Transactions: Structural Ceramics Joining II, The American Ceramic Society, 1993, pp. 323-331.

Suga et al., "Surface activated bonding for new flip chip and bumpless interconnect systems," Electronic Components and Technology Conference, 2002, IEEE, pp. 105-111.

Suga, "UHV room temperature joining by the surface activated bonding method," Advances in science and technology, Techna, Faenza, Italie, 1999, pp. C1079-C1089.

Takagi et al., "Effect of surface roughness on room-temperature wafer bonding by Ar beam surface activation," Japanese Journal of Applied Physics, 1998, vol. 37, Part 1, No. 1, pp. 4197.

Takagi et al., "Low temperature direct bonding of silicon and silicon dioxide by the surface activation method," Solid State Sensors and Actuators, 1997, Transducers '97 Chicago, 1997 International Conference, vol. 1, pp. 657-660.

Takagi et al., "Room-temperature bonding of lithium niobate and silicon wafers by argon-beam surface activation," Appl. Phys. Lett., 1999. vol. 74, pp. 2387.

Takagi et al., "Room temperature silicon wafer direct bonding in vacuum by Ar beam irradiation," Micro Electro Mehcanical Systems, MEMS '97 Proceedings, 1997, IEEE, pp. 191-196.

Takagi et al., "Room-temperature wafer bonding of Si to LiNbO3, LiTaO3 and Gd3Ga5O12 by Ar-beam surface activation," Journal of Micromechanics and Microengineering, 2001, vol. 11, No. 4, pp. 348.

Takagi et al., "Room-temperature wafer bonding of silicon and lithium niobate by means of arbon-beam surface activation," Integrated Ferroelectrics: An International Journal, 2002, vol. 50, Issue 1, pp. 53-59.

Takagi et al., "Surface activated bonding silicon wafers at room temperature," Appl. Phys. Lett. 68, 2222 (1996).

Takagi et al, "Wafer-scale room-temperature bonding between silicon and ceramic wafers by means of argon-beam surface activation," Micro Electro Mechanical Systems, 2001, MEMS 2001, The 14th IEEE International Conference, Jan. 25, 2001, IEEE, pp. 60-63.

Takagi et al., "Wafer-scale spontaneous bonding of silicon wafers by argon-beam surface activation at room temperature," Sensors and Actuators A: Physical, Jun. 15, 2003, vol. 105, Issue 1, pp. 98-102.

Tong et al., "Low temperature wafer direct bonding," Journal of Microelectomechanical systems, Mar. 1994, vol. 3, No. 1, pp. 29-35.

Topol et al., "Enabling technologies for wafer-level bonding of 3D MEMS and integrated circuit structures," 2004 Electronics Components and Technology Conference, 2004 IEEE, pp. 931-938.

Wang et al., "Reliability and microstructure of Au—Al and Au—Cu direct bonding fabricated by the Surface Activated Bonding," Electronic Components and Technology Conference, 2002, IEEE, pp. 915-919.

Wang et al., "Reliability of Au bump—Cu direct interconnections fabricated by means of surface activated bonding method," Microelectronics Reliability, May 2003, vol. 43, Issue 5, pp. 751-756.

Weldon et al., "Physics and chemistry of silicon wafer bonding investigated by infrared absorption spectroscopy," Journal of Vacuum Science & Technology B, Jul./Aug. 1996, vol. 14, No. 4, pp. 3095-3106.

Westphal, W.B. et al., "Dielectric constant and loss data," Air Force Materials Laboratory, Apr. 1972.

Xu et al., "New Au—Al interconnect technology and its reliability by surface activated bonding," Electronic Packaging Technology Proceedings, Oct. 28-30, 2003, Shanghai, China, pp. 479-483.

Ceramic Microstructures: Control at the Atomic Level, Recent Progress in Surface Activated Bonding, 1998, pp. 385-389.

Bush, Steve, "Electronica: Automotive power modules from On Semi," ElectronicsWeekly.com, indicating an ONSEMI AR0820 product was to be demonstrated at a Nov. 2018 trade show, https://www.electronicsweekly.com/news/products/power-supplies/electronica-automotive-power- modules-semi-2018-11/ (published Nov. 8, 2018; downloaded Jul. 26, 2023).

Morrison, Jim et al., "Samsung Galaxy S7 Edge Teardown," Tech Insights (posted Apr. 24, 2016), includes description of hybrid bonded Sony IMX260 dual-pixel sensor, https://www.techinsights.com/blog/samsung-galaxy-s7-edge-teardown, downloaded Jul. 11, 2023, 9 pages.

ONSEMI AR0820 image, cross section of a CMOS image sensor product. The part in the image was shipped on Sep. 16, 2021. Applicant makes no representation that the part in the image is identical to the part identified in the separately submitted reference Bush, Nov. 8, 2018, ElectronicsWeekly.com ("Bush article"); however, the imaged part and the part shown in the Bush article share the part number "ONSEMI AR0820.".

SONY IMX260 image, cross section of Sony dual-pixel sensor product labeled IMX260, showing peripheral probe and wire bond pads in a bonded structure. The part in the image was shipped in Apr. 2016. Applicant makes No. representation that the part in the image is identical to the part identified in the separately submitted reference Morrison et al. (Tech Insights article dated Apr. 24, 2016), describing and showing a similar sensor product within the Samsung Galaxy S7; however the imaged part and the part shown in the Morrison et al. article share the part name "SONY IMX260.".

\* cited by examiner

CROSS-SECTIONAL VIEW OF SILICON RIBBED
WAVEGUIDE CROSS-SECTION

INTEGRATED OPTICAL WAVEGUIDES, DIRECT-BONDED WAVEGUIDE INTERFACE JOINTS, OPTICAL ROUTING AND INTERCONNECTS

RELATED APPLICATIONS

The patent application is a divisional of U.S. patent application Ser. No. 16/247,262 to Huang et al., filed Jan. 14, 2019, entitled, "Integrated optical waveguides, direct-bonded waveguide Interface joints, optical routing and Interconnects," which claims the benefit of priority to U.S. Provisional Patent Application No. 62/635,314 to Huang et al., filed Feb. 26, 2018, entitled, "Integrated optical waveguides, direct-bonded waveguide Interface joints, optical routing and Interconnects," the entire contents of each of which are hereby incorporated herein by reference.

BACKGROUND

In the past, conventional fabrication of silicon and silicon dioxide (silica) optical waveguides traditionally relied on high temperatures that exceeded 1000° C. Such high temperatures damaged or weakened microelectronic devices. Conventional waveguides based on silicon and silicon dioxide also required a light-bending radius that was too large to include such optoelectronic circuits on small electronic dies and chips. Ongoing efforts aim to fully integrate silicon photonics with conventional microelectronics in unified packages, where optical interconnects provide faster data transfer between dies and microchips, and also faster data transfer within the dies and chips themselves.

Silicon, as a good conductor of infrared light, has become important to optoelectronics and provides many technical and economic advantages. Silicon photonics can combine the advantages of photonics with the widespread use of silicon in conventional CMOS manufacturing. Photonics offers high-performance communication, low power of operation, and small size and weight. CMOS offers volume production, low cost, miniaturization, and high integration. Silicon photonics therefore provides high integration, miniaturization, higher bandwidth, lower cost, and lower power of operation. Micro-optoelectronic integration using silicon photonics also cuts the cost of optical links.

Compound semiconductors for optoelectronics and silicon photonics combine an element from group III of the periodic table (e.g., In, Ga, Al) with an element from group V of the periodic table (e.g., As, P, Sb, N). This yields twelve different III-V compounds, but the most commercially useful of these are currently GaAs, InP, GaN, and GaP. On a silicon substrate it is very difficult to epitaxially grow quality III-V semiconductor materials needed for mass-produced construction of photonic devices. Fabrication procedures such as etching are completely different from silicon processes. Moreover, contamination from III-V semiconductors must be completely prevented from contact or inclusion with the silicon of silicon electronics. Thus, it is difficult to introduce III-V semiconductor compounds into silicon electronics. Polymer waveguides of organic compounds cause less damage to electronic devices, but they are limited to the uppermost layers available only after electronic circuits have been completed, or to other locations isolated from the electronic devices being fabricated because they cannot withstand the high temperatures present in electronic device fabrication.

Silicon photonic circuits most often operate in the infrared at a wavelength of 1550 nanometers, at which silicon becomes a good conduit for transmission of the infrared optical beams. A top and bottom cladding of silicon dioxide (silica) on a waveguide structure made of silicon confines the infrared light within the silicon due to differences in the refraction indices of silicon and silicon dioxide, similar in some respects to how light is conducted in a fiber optic filament. Silicon photonic devices that use such silicon waveguides can be constructed by semiconductor fabrication techniques previously used exclusively for microelectronics. Since silicon is already used as the substrate in most conventional integrated circuits for microelectronics, hybrid devices in which the optical and electronic components are integrated onto a single microchip can be made with conventional semiconductor fabrication processes, sometimes even without retooling.

Processes that fabricate photonic devices using silicon and silicon dioxide can also utilize conventional silicon on insulator (SOI) techniques that are already well-known in microelectronics, providing a SOI waveguide layer on a wafer, to which optical dies such as LEDs, lasers, and photodetectors may be conventionally attached by less-than-ideal means.

SUMMARY

Integrated optical waveguides, direct-bonded waveguide interface joints, optical routing and interconnects are provided. An example optical interconnect joins first and second optical conduits. A first direct oxide bond at room temperature joins outer claddings of the two optical conduits and a second direct bond joins the inner light-transmitting cores of the two conduits at an annealing temperature. The two low-temperature bonds allow photonics to coexist in an integrated circuit or microelectronics package without conventional high-temperature photonics processes destroying the microelectronics. Direct-bonded square, rectangular, polygonal, and noncircular optical interfaces provide better matching with rectangular waveguides and better performance. Direct oxide-bonding processes can be applied to create running waveguides, photonic wires, and optical routing in an integrated circuit package or in chip-to-chip optical communications without need for conventional optical couplers. An example wafer-level process fabricates running waveguides, optical routing, and direct-bonded optical interconnects for a silicon photonics-microelectronics package when two wafers are joined.

This summary is not intended to identify key or essential features of the claimed subject matter, nor is it intended to be used as an aid in limiting the scope of the claimed subject matter.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

DESCRIPTION

Overview

Figure 1:
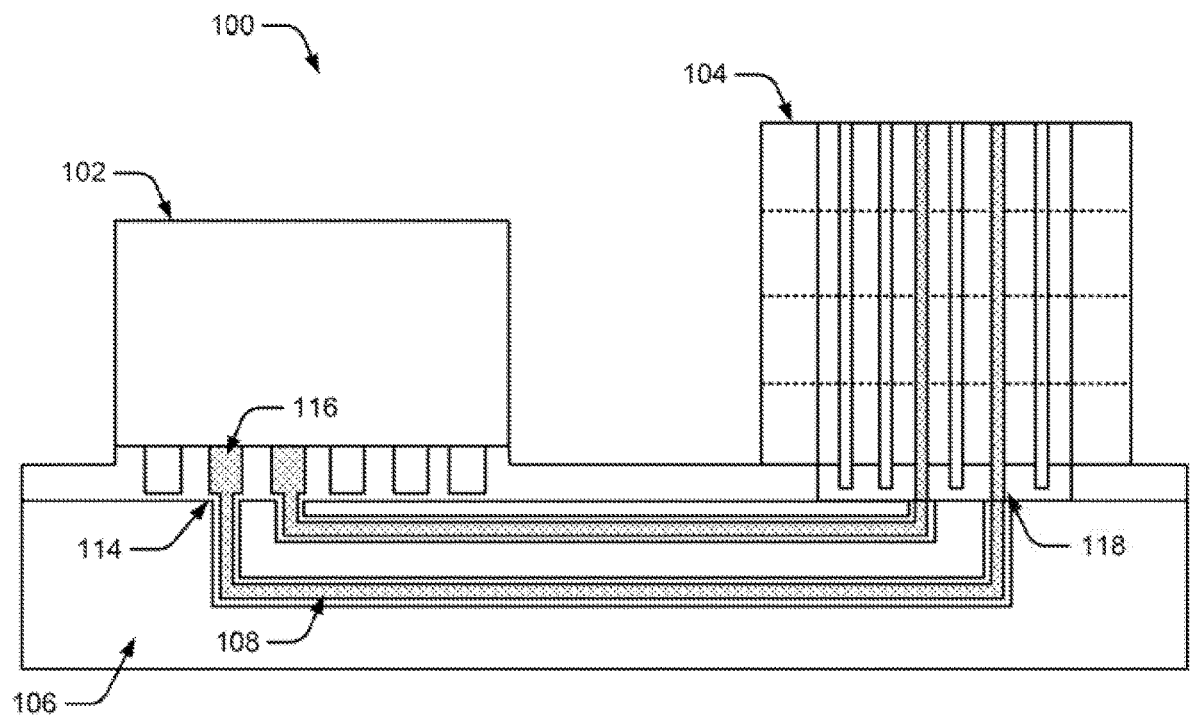
FIG. 1 is a diagram of an example optoelectronics package with components coupled by an optically-enabled interposer with direct-bonded waveguide interface joints.
Figure 1:
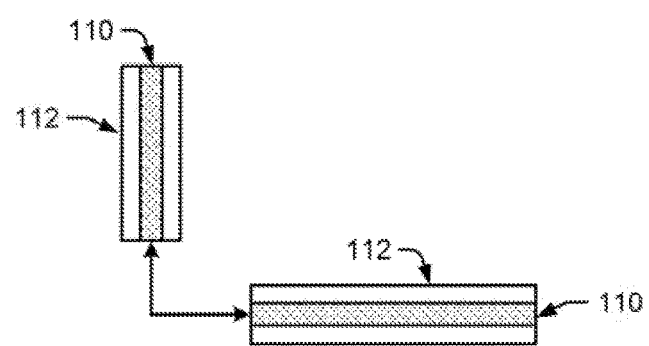

This disclosure describes integrated optical waveguides, direct-bonded waveguide interface joints, optical routing and interconnects. Example processes and apparatuses described herein provide various ways of using direct bonding techniques to create integrated optical waveguides, direct-bonded waveguide interface joints, photonic wire, and chip-to-chip optical routing. Optical transmission and routing terms and phrases, such as "optical conduit," "optical trace," "waveguide," "photonic wire," "optical circuit," and component parts of these, may be used somewhat interchangeably herein, depending on context.

An example optical interconnect joins first and second optical conduits. A first direct oxide bond performed at room temperature joins outer claddings of the two optical conduits, and a second direct bond joins the inner light-transmitting cores of the two conduits at an annealing temperature, for example. The second direct bonding of the inner cores is formed during an annealing process due to the differential in coefficients of thermal expansion between the outer cladding and the inner core of each optical conduit being joined. These two low-temperature bonds allow photonics processes to be applied in a single integrated circuit or microelectronics package without conventional high-temperature photonics processes destroying the microelectronics. Direct-bonded square, rectangular, polygonal, and noncircular optical interfaces with no gaps or minimal gaps in the interface between surfaces, and no detrimental extra layers added to make the interface, provide better matching with rectangular waveguides and provide better performance. Direct oxide-bonding processes can be applied to create running waveguides, photonic wires, and optical routing in an integrated circuit package or in chip-to-chip optical communications without need for conventional optical couplers. An example wafer-level process fabricates running waveguides, optical routing, and direct-bonded optical interconnects for a silicon photonics-microelectronics package when two wafers are joined.

The example integrated optical waveguides, direct-bonded waveguide interface joints, optical routing and interconnects described herein provide nano-small geometrical structures for compatibility with silicon electronics, so that very small optoelectronics packages may be produced.

The example integrated waveguides described herein can accommodate passive and dynamic photonic devices, wavelength filters, modulators, as well as compatibility with light emission functions, and light detection functions with low propagation loss.

The example optical waveguides used as photonic routing can have nano-small core dimensions and micrometer-scale bending sections to match the scale of microelectronic circuits. The example waveguides can be constructed on silicon-on-insulator (SOI) substrates, where the uppermost silicon layer of the SOI substrate is employed as the waveguide core, eliminating the need to specially form the core material. The cladding material can be silica-based compounds like silicon dioxide, formed by low-temperature processes, plasma-enhanced chemical vapor deposition, and so forth. Bonding between materials at the example optical interfaces can be performed by low-temperature DBI or ZIBOND direct bonding processes (Xperi Corporation, San Jose, CA). These features result in optoelectronic packages that have low power consumption and low packaging cost.

Example Systems

FIG. 1 shows an example optoelectronics package 100, with an optoelectronic computing chip 102 optically coupled with an optoelectronic memory stack 104 through an optically-enabled interposer 106. The interposer 106 may be a substrate or part of a substrate, or may be an optoelectronic chip in its own right.

The interposer 106 has one or more optical conduits 108 built into the interposer 106. In an implementation, the optical conduits 108 may include a waveguide or a photonic wire. In a silicon photonics implementation, a ribbed and/or rectangular waveguide version of the optical conduits 108 may transmit or guide ("conduct") infrared light as optical communications power.

The optical conduits 108 each generally include an inner core 110 surrounded by an outer cladding 112. The inner core 110 transmits optical power in one of several possible modes, while the outer cladding 112 confines the infrared light within the silicon inner core 110 due to differences in the refraction indices of silicon and silicon dioxide. In a rectangular waveguide implementation of the optical conduits 108, top and bottom claddings 112 of silicon dioxide on a silicon waveguide structure of rectangular cross-section confine the infrared light within the silicon. In a ribbed implementation of the silicon waveguide optical conduits 108, a rectangular rib on one side of the rectangular waveguide structure guides, directs, and/or bends the optical power wavefront. Example optical interfaces 114 optically join device optical conduits 116 & 118 of the optoelectronic computing chip 102 and of the optoelectronic memory stack 104 with the optical conduits 108 of the interposer 106, in this example.

Figure 2:
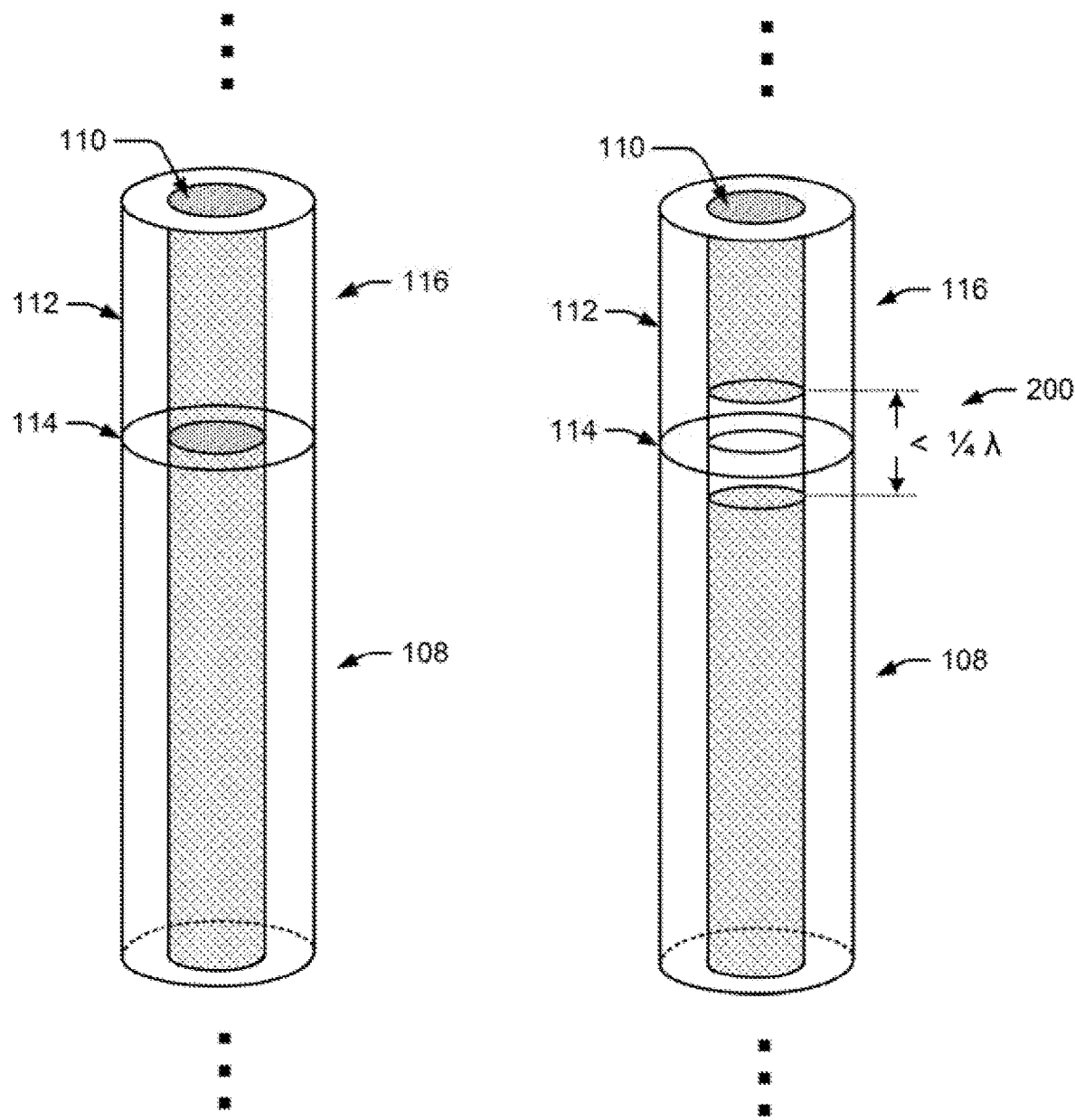
FIG. 2 is a diagram of an example optical interface between example optical conduits.

FIG. 2 shows an example optical interface 114 between example optical conduit 116 and optical conduit 108. The optical interface 114 may also include electrical contacts bonded to each other with low-temperature direct bonds (not shown). The example optical interface 114 provides a direct bonding waveguide interface joint. A first example technique applies direct oxide bonding to create the optical interface 114 between a first optical component, such as the photonics of the optoelectronic computing chip 102 and a second optical component, such as an optical waveguide version of the optical conduits 108 of the interposer 106. The example technique for making optical interfaces can be used in the construction of 3D and 2.5D photonic integrated circuits, for example.

In the example process for creating an optical interface 114, an inner core 110 of the optical conduits 116 & 108 may be made of a first material that conducts light at one or more wavelengths. The inner light-transmitting material may be silicon (Si), or other optical materials such as $ZrO_2$, $HfO_2$, $TiO_2$, $LiNbO_3$, $Nb_2O_5$, $SrTiO_3$, or ZnS, for example. The outer cladding 112 of the optical conduits 116 & 108 has a lower refractive index than the material that makes up the inner core 110 of the optical conduits 116 & 108, so that the inner core 110 transmits the light and the outer cladding 112 reflects or refracts light that is leaving the inner core 110 back into the inner core 110. The outer cladding material may be silicon dioxide ($SiO_2$) in the case of a silicon inner core 110, for example, or may be a polymer, such as polyimide, parylene, or other material with a suitable refractive index with respect to the material of the inner core 110 of the optical conduits 116 & 108.

In an implementation, through a direct bonding process, such as a direct oxide bonding process or an oxide-to-oxide direct bonding process, the outer cladding 112 is joined to a counterpart of the same material on the other side of the interface 114. In an implementation, the example direct oxide-bonding process takes place at room temperature, with minimal or no gaps, between surfaces being joined, and no detrimental extra layers created or introduced into the optical interface 114 during the process.

Depending on materials and process, there may be an allowable gap 200 or multiple partial gaps between the inner cores 110, at the surfaces being joined, or there may be no gaps. A permissible gap 200 has a gap size (vertical gap) less than one-quarter of the wavelength of the operational optical signal being conducted as electromagnetic waves. The gap 200 is shown as exaggerated in FIG. 2, for purposes of illustration. For silicon photonics, using silicon as the inner core 110 of a conduit 108, the signal is often conducted by infrared light at a wavelength of approximately 1550 nanometers, or in the range of approximately 1100-1550 nanometers. So in some circumstances, a gap 200 of less than approximately 387.5 nanometers is permissible in the interface between conduits 108 & 116, either as part of a fabrication process or a defects. The inner cores 110 of the optical conduits 116 & 108, within the respective outer claddings 112, are also direct-bonded in a second step to their counterparts of inner core material on the other side of the interface 114, during an annealing step or separate annealing process, for example. The annealing process may have an annealing temperature that is at least slightly higher than room temperature, but is still a very low-temperature when compared with conventional fabrication temperatures for conventional optical waveguides. The direct-bonding of the inner cores 110 to each other to complete the optical interface 114 also introduces minimal or no gaps and no detrimental extra layers of material into the interface 114 being formed, during the process.

The first direct oxide bond and the second direct bond join the first optical conduit 116 and the second optical conduit 108 together in a layerless join or a join with no detrimental intervening layers between the first optical conduit 116 and the second optical conduit 108. Likewise, the first direct oxide bond and the second direct bond join the first optical conduit 116 and the second optical conduit 108 together in a join with no gap or permissible gap between the first optical conduit 116 and the second optical conduit 108.

The optical interface 114 may also include electrical contacts associated with each of the first optical conduit 116 and the second optical conduit 108, wherein a first set of electrical contacts of the first optical conduit 116 are direct oxide bonded or direct bonded to a second set of electrical contacts of the second optical conduit at the optical interface 114.

In an implementation, an example apparatus includes a first optical conduit 116 on a first side of an optical interface 114 of a photonic device, a second optical conduit 108 on a second side of the optical interface 114 of the photonic device, and a first direct oxide bond between outer claddings 112 of the first optical conduit 116 and the second optical conduit 108. There is a second direct bond between inner cores 110 of the first optical conduit 116 and the second optical conduit 108. The apparatus may further include a first optical component 102 on the first side of the optical interface 114, the first optical component 102 having at least a first planar surface exposing a cross-section of the first optical conduit 116, and a second optical component 104 on the second side of the optical interface 114. The second optical component 104 also has at least a second planar surface exposing a cross-section of the second optical conduit 108, which may be an optical waveguide. The second optical conduit 108 also has an inner core 110 and an outer cladding 112 around the inner core 110.

The first direct oxide bond between the outer claddings 112 of the two optical conduits 116 & 108 can be an oxide bond formed at room temperature, such as a ZIBOND brand of direct oxide-to-oxide bonding (Xperi Corporation, San Jose, CA). The second direct bond of the inner cores 110 can be a metal-to-metal, semiconductor-to-semiconductor, or photonic-material-to-photonic-material bond formed at an annealing temperature used for strengthening, curing or setting the previous direct oxide bond for the outer claddings 112. For example, two surfaces of silicon may form crystal lattice bonds at the optical interface with each other. ZIBOND bonding is a low-temperature wafer-to-wafer or die-to-wafer bonding technique between wafers or dies with the same or different coefficients of thermal expansion (CTE), using a low-temperature homogeneous (oxide-to-oxide) direct bonding technology. ZIBOND bonding offers multiple benefits over conventional bonding techniques such as adhesives, anodic bonding, eutectic bonding and glass frit. Bonding is performed at room temperature, which enhances overall yield and reliability, by eliminating the negative effects associated with coefficient of expansion (CTE) mismatch, warpage and distortion. Higher throughput and lower cost-of-ownership are realized by using industry-standard wafer alignment and bonding equipment. Without requiring elevated temperature or high pressure during bonding, the high-throughput of the ZIBOND bonding fabrication process minimizes cost-of-manufacturing during mass-production for high volume market applications. During ZIBOND processing, industry standard dielectric surfaces like silicon dioxide or silicon carbide nitride are polished to low surface roughness using conventional chemical-mechanical polishing (CMP) tools, and nitrogen-based chemistries are applied through conventional plasma etch processing. Prepared wafer surfaces are then simply aligned and placed together, resulting in the spontaneous formation of chemical bonds between die and/or wafers. A very strong, low distortion chemical bond with a bond strength about half the strength of silicon can be obtained at room temperature, and a reliable hermetic bond stronger than silicon can be obtained after moderate heating to about 150° C. in batch processes outside of the alignment and placement tool, for example.

Figure 3:
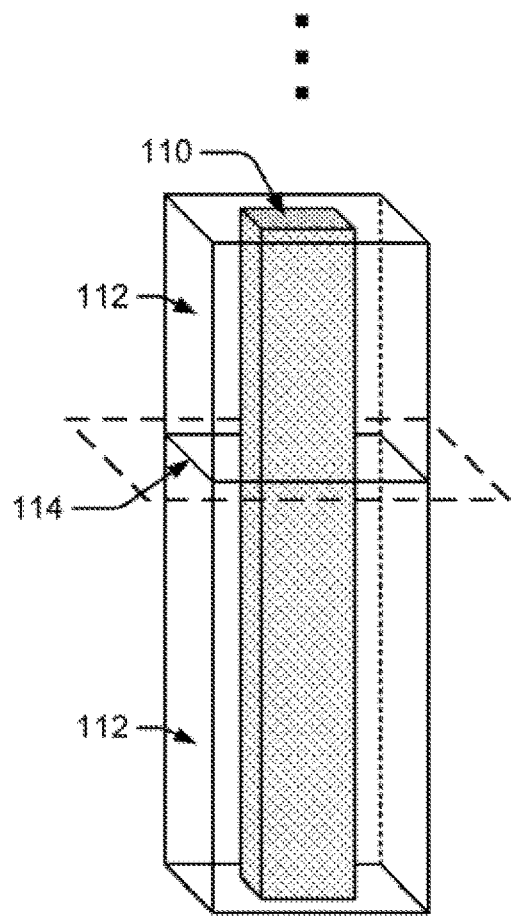
FIG. 3 is a diagram of an example optical interface with noncircular cross-section, between example optical conduits.
Figure 3:
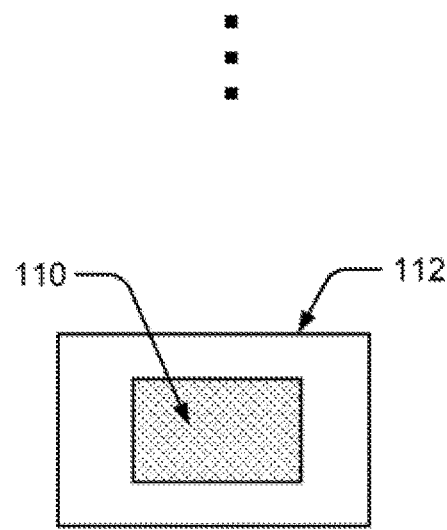

FIG. 3 shows an example optical interface 114 between the first optical conduit 116 and the second optical conduit 108, with a noncircular cross-section in a plane of the optical interface 114. The optical interface 114 may also include electrical contacts bonded to each other with low-temperature direct bonds (not shown). The example optical interface 114 provides a direct bonding waveguide interface joint. In an implementation, the optical interface 114 comprises a join having a noncircular cross-section between the first outer cladding 112 of the first optical conduit and the second outer cladding 112 of the second optical conduit in the plane of the optical interface. The optical interface 114 also has a noncircular join between the first inner core 110 of the first optical conduit and the second inner core 110 of the second optical conduit.

In one instance, the optical interface 114 may have a rectangular cross-section, a square cross-section, or a polygonal cross-section in a plane of the optical interface 114. In some cases, the first optical conduit 108 on one side of the optical interface 114 has a noncircular, rectangular, square, or polygonal cross-section and the other optical conduit 116 has a circular cross-section in the plane of the optical interface.

Figure 4:
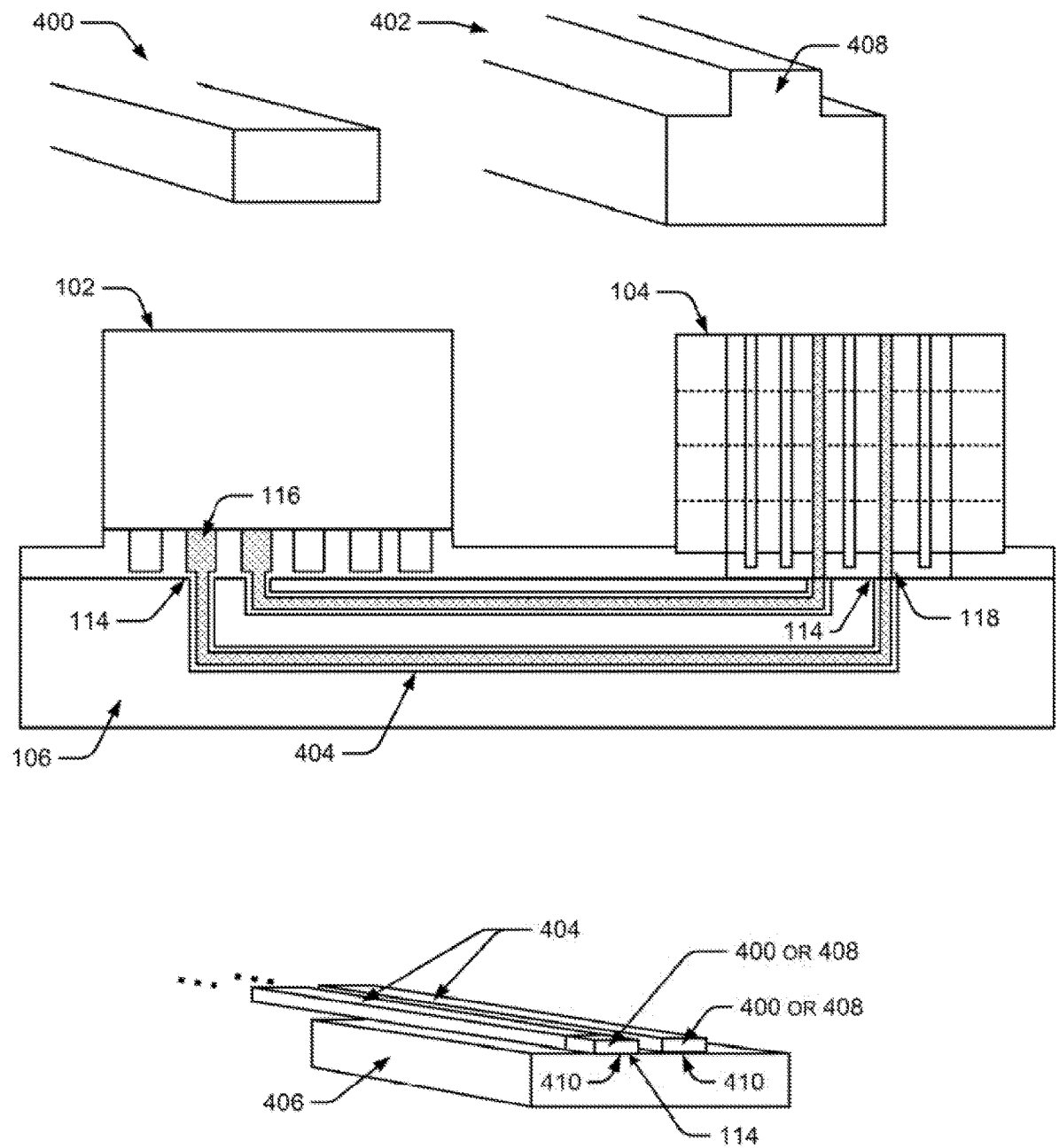
FIG. 4 is a diagram of example optical waveguides and optical traces with waveguide interface joints created by processes that include direct bonding at low-temperatures.

FIG. 4 shows example optical waveguides 400 created by processes that include direct bonding at low-temperatures. The optical waveguides 400, including ribbed waveguides 402, can be routed as optical traces 404 or photonic wires in microelectronic and optoelectronic circuit layouts. The low-temperature direct bonding technique can also be used to attach the optical waveguides 400 to chips 102 & 406 and to other components with example optical interfaces 114 in ways that can eliminate the need for optical couplers in chip-to-chip communications. The example optical interface 114 provides a direct bonding waveguide interface joint between the optical traces 404 and the optoelectronic microchip 406. The waveguides 400, fabricated using low-temperature bonding techniques, can be formed as optical traces 404 along the surface layers of chips 406, and between chips, to provide optical routing similar to the routing of electrical conductors, at reduced size over conventional optical channels.

An example optoelectronic apparatus includes an optical trace 404 bonded to a die or a chip 406 made at least in part of a semiconductor material, and a direct oxide bond between the optical trace 404 and the die or chip 406. The direct oxide bond may be an oxide-to-oxide bond formed at room temperature or at a temperature near or below room temperature. Material used for the waveguides 400 employed at optical traces 404 are optically transparent or photonic materials, including some semiconductors. The direct oxide bond itself can be optically transparent, or optically transparent at least in part.

In one layout, the optical trace 404 transmits a light or electromagnetic radiation between a first die or chip 102 and a second die, chip 104, or stack of dies. The optical trace 404 may be directly oxide-bonded to a first die or chip 102 and to a second die or chip 104. The optical trace 404 can provide an optical path between the first die or chip 102 and the second die 104 or chip without conventional inline optical couplers.

In an implementation, on a given die or microchip 406, the optical trace 404 may be a rib member 408 of an optical waveguide. The rib member 408 is direct bonded 410 to a semiconductor material of the die or microchip 406 to make the optical waveguide 402 serving as an optical trace 404, wherein the optical waveguide 402 comprises the rib member 408, the direct bond 410, and the semiconductor material of the die or the microchip 406.

Figure 5:
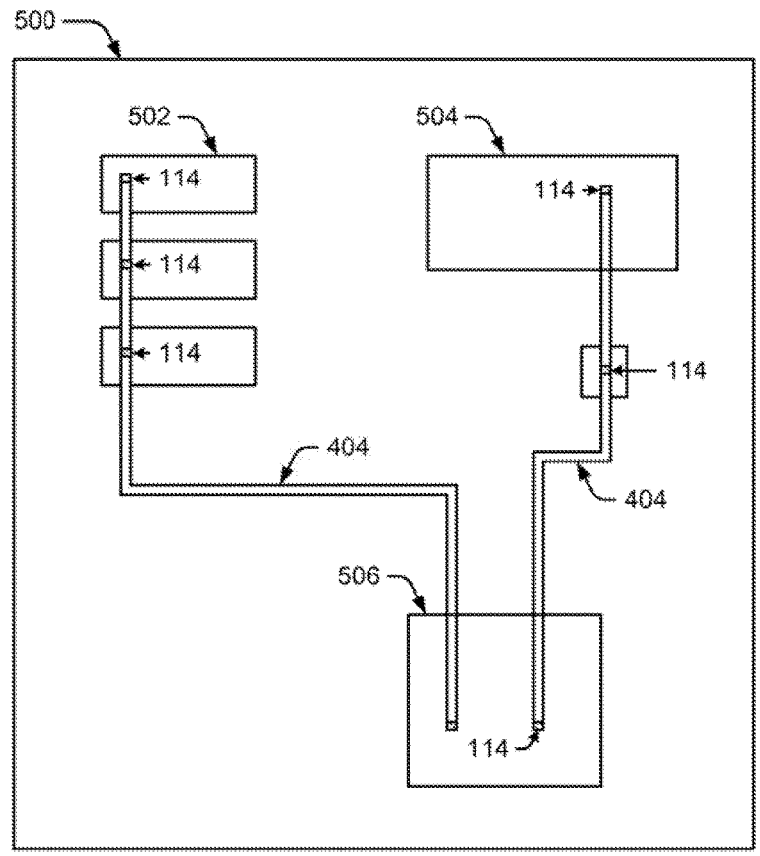
FIG. 5 is a diagram of an example substrate, such as a silicon on insulator (SOI) substrate, with photonic waveguides as optical traces attached to the substrate via direct bonding techniques.
Figure 5:
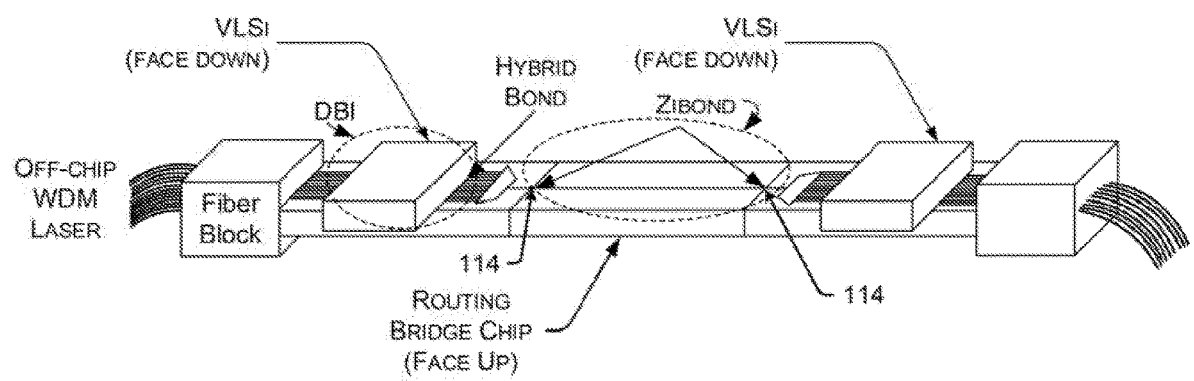

FIG. 5 shows a substrate, such as a silicon on insulator (SOI) substrate 500, with photonic waveguides as optical traces 404 attached to the substrate 500 via direct bonding techniques. The optical traces 404 are routed on the substrate 500 to and between microchips 502 & 504 & 506. The optical traces 404 may be rectangular waveguides 400 or ribbed waveguides 402. In an implementation, only the rib member 408 is direct-bonded to a semiconductor material of the substrate 500, such as a silicon on insulator (SOI) substrate 500, to create waveguides 400 & 402 for routing optical paths. The tops of waveguides 400 and 402 may be clad with an oxide 112 of suitable refractive index, such as silicon dioxide, to complete the waveguide structures. The waveguides 400 & 402 may also be attached as a layer of semiconductor, for example, to an SOI wafer or substrate, and then etched into waveguide structures 400 & 402 and topped with silicon dioxide or other material with suitable index of refraction to make optical waveguide structures 400 and 402. The optical traces 404 as completed waveguides can provide a continuous optical trace 404, an optical bus, and an unbroken optical pathway between the multiple dies or microchips 502 & 504 & 506 across the substrate 500, using low-temperature direct bonding techniques.

The low-temperature direct bonding techniques are used to attach the optical traces 404 to chips 502 & 504 & 506 and to other optoelectronic components with example optical interfaces 114 that eliminate the need for optical couplers in chip-to-chip communications. The example optical interfaces 114 provides direct bonding waveguide interface joints between the optical traces 404 and optoelectronic microchips 502 & 504 & 506.

Figure 6:
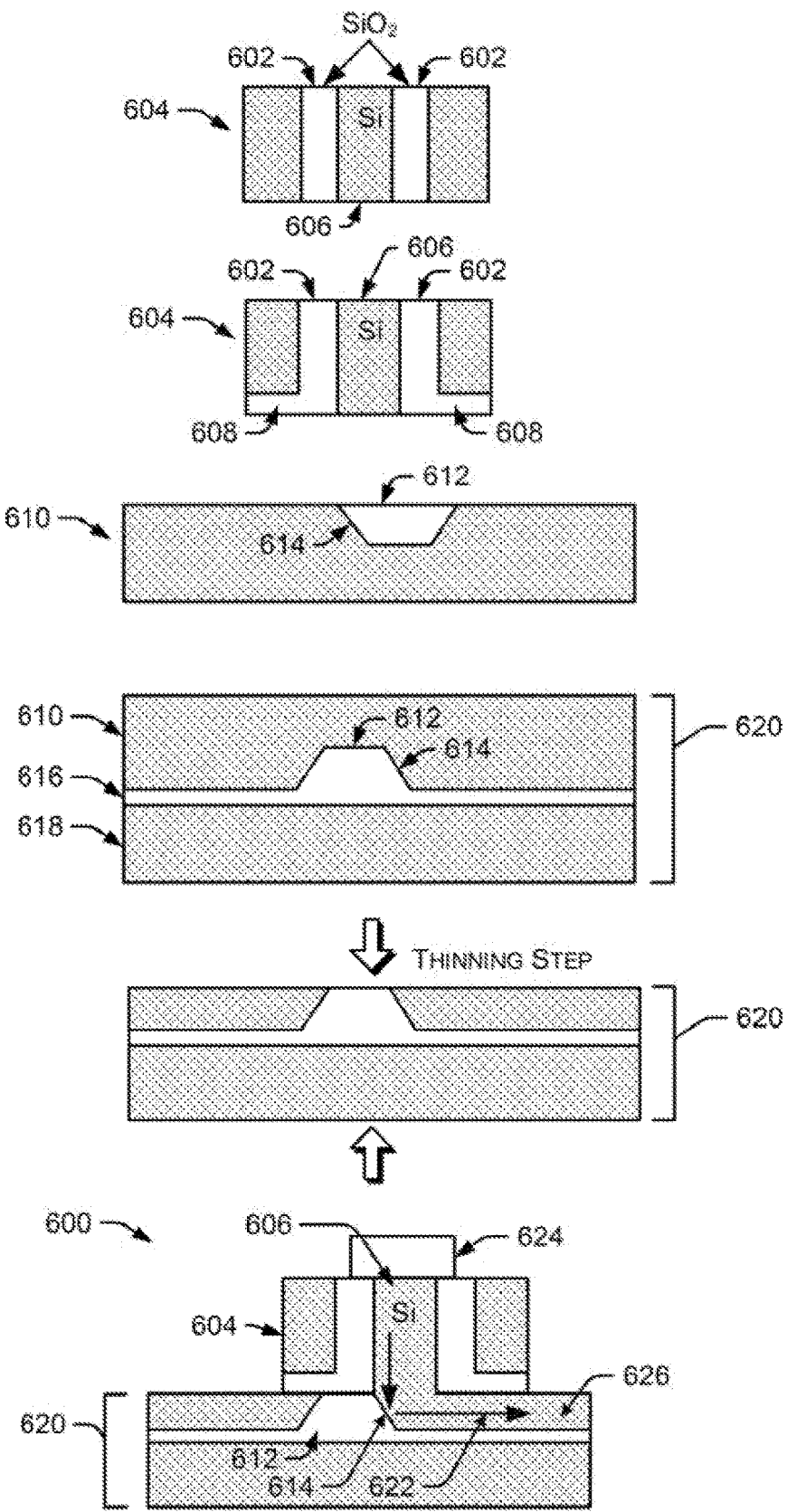
FIG. 6 is a diagram of an example integrated optical waveguide fabricated by a wafer-level process.

FIG. 6 shows an example photonic or optoelectronic apparatus, such as an integrated optical waveguide 600, fabricated by wafer-level fabrication. The wafers for making the optoelectronic apparatus may have dies for optoelectronics or microelectronics, and may also have optical devices with III-V semiconductor optical compounds, mounted to one or more of the wafers.

To make the example apparatus or integrated optical waveguide 600, an example process includes coupling optical components and electrical contacts together across an optical interface at a single bonding surface between the wafers, while simultaneously fabricating photonic waveguides for optical routing in the optoelectronic package or structure being formed. The use of low-temperature direct oxide bonds in this example process allows unification or convergence of silicon photonics and microelectronics together in the same wafer-produced package. Some aspects of the example process can also be used to form waveguides in die-to-die processes or to perform vertical direct optical coupling and electrical coupling of contacts from one die to another with minimal or no gaps and no detrimental extra layers, and without requiring underfill or bumps.

In one implementation, a channel 602 is etched in a first wafer 604 of silicon to make a silicon pillar 606 surrounded by the channel 602 in the first wafer 604. The channel 602 may be filled with a dielectric that has a suitable refractive index relative to the silicon to create an optical conduit and part of a waveguide.

A recess 608 is formed in the first wafer 604 of silicon in an area around the channel 602 and silicon pillar 606. A first oxide material is deposited in the recess 608 for later purposes of direct oxide-bonding between wafers, at low-temperature.

On a second wafer 610 made of silicon, a trench 612 is etched, having an angled side 614, such as at least one 45 degree side in the trench 612. A second oxide is deposited in the trench 612. The oxide deposited in the trench 612 of the second wafer 610 may be the same oxide as deposited in the recess 608 of the first wafer 604.

The trench-side of the second wafer 610 is bonded to at least an oxide layer 616 of a third wafer 618 to make an interposer 620. The interposer 620 may be thinned at this point, as desired. The first wafer 604 is then bonded to the interposer 620 by direct oxide-to-oxide-bonding of the first oxide in the recess 608 of the first wafer 604 to at least the oxide in the trench 612 of the second wafer 610 to make the example integrated waveguide 600 of silicon, or other optical apparatuses bonded at a single waveguide interface plane with direct oxide bonding.

Prior to bonding the first wafer 604 to the interposer 620 to make the integrated waveguide 600, the silicon pillar 606 of the optical conduit of the first wafer 604 is aligned with the angled side 614 of the trench 612 of the interposer 620 in order to fabricate an optical pathway 622 that connects optical power between a component 624 mounted on the first wafer 604 and the integrated waveguide 600. In an implementation, the integrated waveguide 600 guides the optical power around a corner formed by the angled side 614 of the trench 612 of the interposer 620, that is, from a vertical silicon pillar 606, for example, to a horizontal layer 626 of the silicon.

In an implementation, aligning the silicon pillar 606 with a 45 degree side 614 of the trench 612 prior to the bonding makes an integrated waveguide 600 capable of guiding infrared light propagating vertically from the silicon pillar 606 through a 90 degree change in direction into the horizontally disposed silicon layer 626 in the interposer 620.

The example process may use direct oxide-to-oxide-bonding between the oxide in the recess 608 of the first wafer 604 and the oxide in the trench 612 of the second wafer 610 or interposer 620, with the bonding at room temperature, which favors microelectronics located in the same vicinity, as higher temperatures can be detrimental to the microelectronics. The low bonding temperature also allows optoelectronic components with III-V semiconductor compounds to be fully finished and mounted prior to the bonding. Conventionally, components with III-V semiconductor compounds need special handling because they cannot withstand conventional microelectronics bonding temperatures.

The silicon of the pillar 606 and the silicon in the top horizontal layer 626 of the interposer 620 are joined together at the same time as the oxide interface, with spontaneous crystal lattice bonding at an annealing temperature slightly higher than room temperature.

Figure 7:
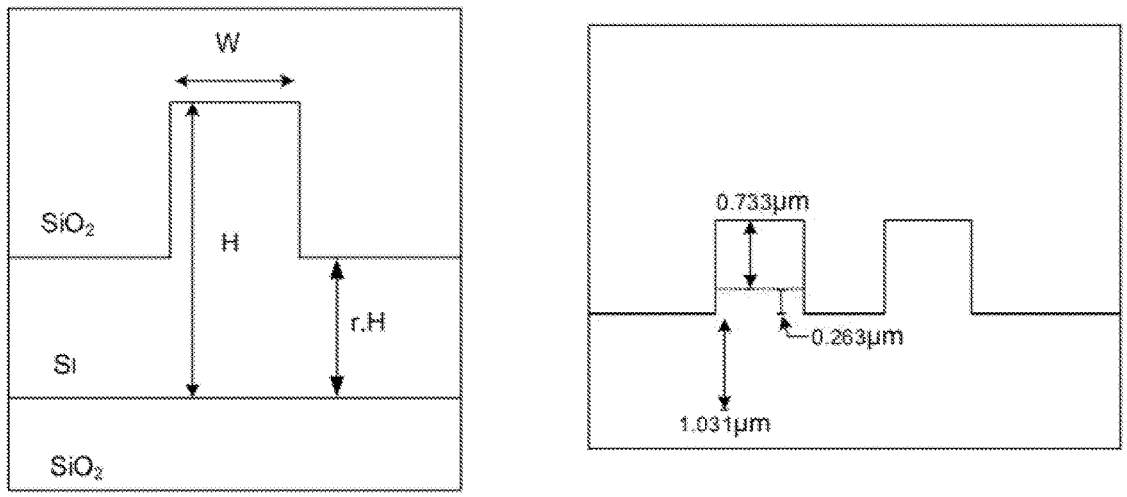
FIG. 7 is a diagram of example mode profiles of a silicon ribbed waveguide with dimensions suitable for optical routing and chip-to-chip communications via integrated optical waveguides and direct-bonded waveguide interface joints.
Figure 7:
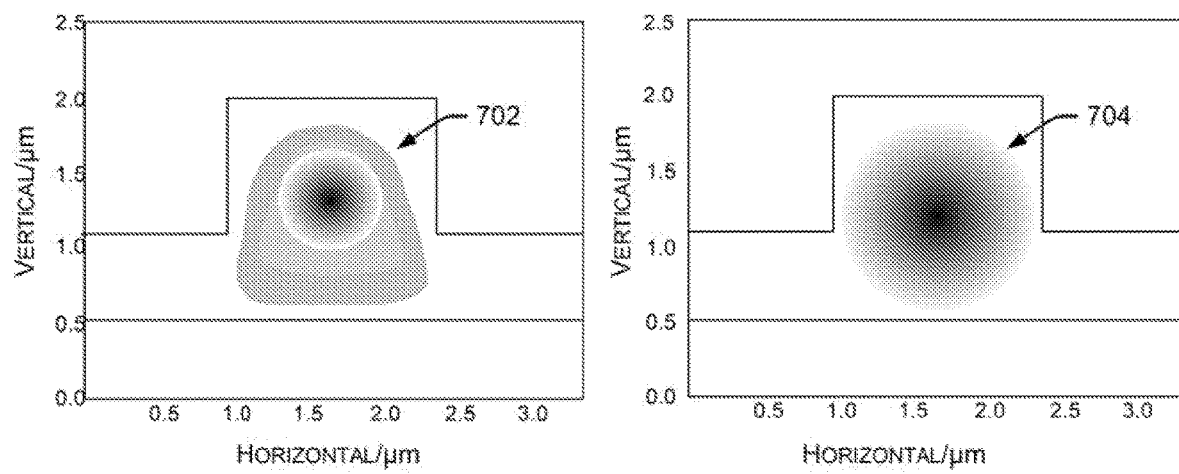

FIG. 7 shows diagrams of direct oxide-to-oxide bond-enabled silicon ribbed waveguides and example mode profiles. At dimensions of W=1.4 µm, H=1.5 µm, and r=0.39 at 1.55 µm, an example polarization-independent SOI ribbed waveguide has a fundamental transverse electric-like (TE-like) mode 702 (Ex field profile) with no electric field in the direction of propagation, and the example polarization-independent SOI ribbed waveguide has a fundamental transverse magnetic-like (TM-like) mode 704 (intensity profile) with no magnetic field in the direction of propagation.

Figure 8:
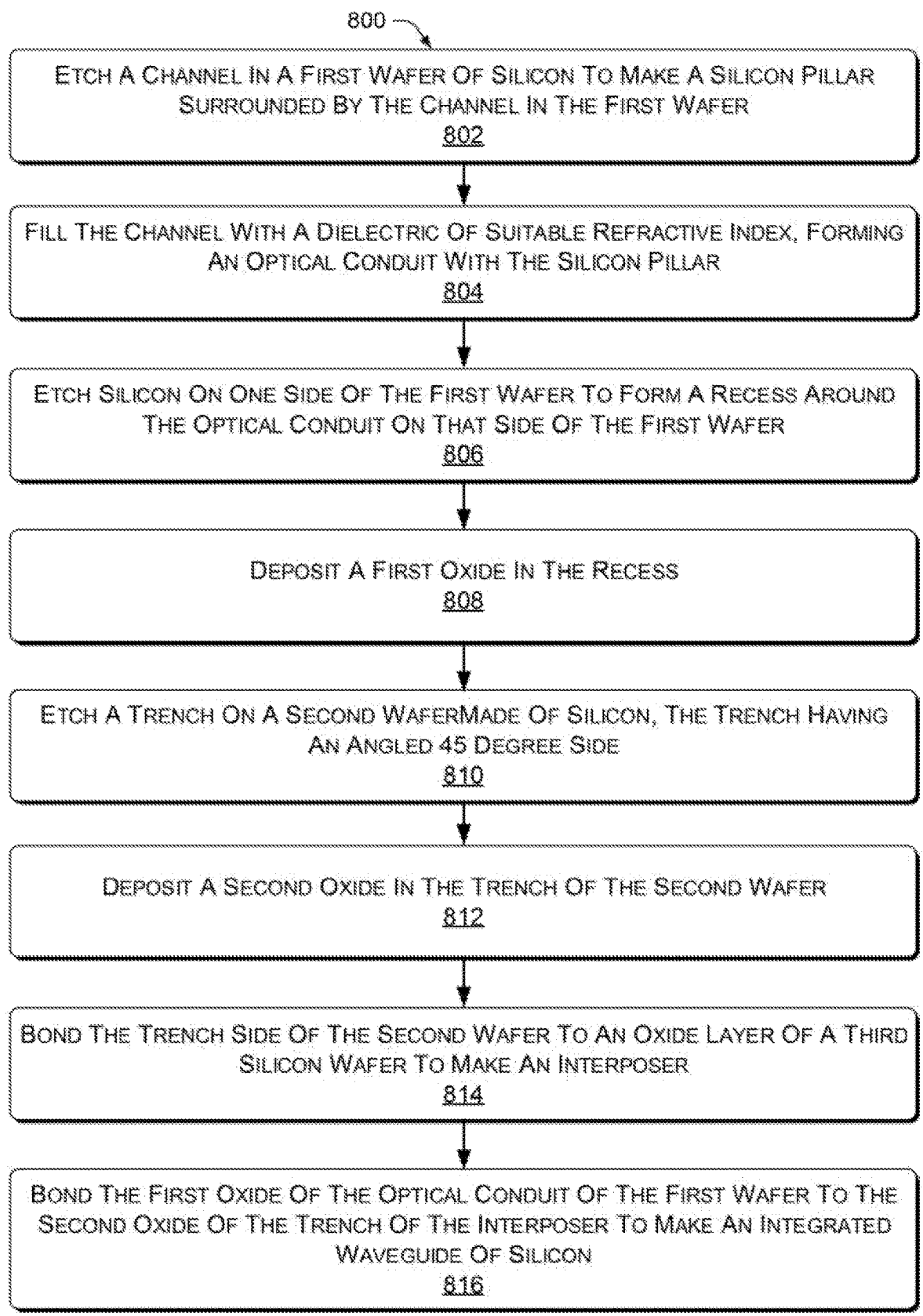
FIG. 8 is a flow diagram of an example method of making an integrated optical waveguide in a wafer-level process

FIG. 8 shows an example method 800 of making an integrated optical waveguide in a wafer-level process. Operations of the example method are shown in individual blocks.

At block 802, a channel is etched in a first wafer of silicon to make a silicon pillar surrounded by the channel in the first wafer. The method is not limited to silicon, but can be implemented in silicon as an example, to combine optical communications with microelectronics in a silicon photonics package.

At block 804, the channel may be filled with a dielectric or other material of suitable refractive index. The dielectric and the pillar being surrounded by the dielectric comprise an optical conduit for infrared light, in the case of silicon.

At block 806, the silicon on one side of the first wafer is etched or otherwise removed to form a recess around the optical conduit on that side of the first wafer.

At block 808, a first oxide is deposited in the recess.

At block 810, a trench is etched on a second wafer made of silicon, the trench having an angled side, such as at least one 45 degree side.

At block 812, a second oxide is deposited in the trench of the second wafer. The second oxide may be the same oxide compound as deposited in the recess of the first wafer, at block 808, or may be a different oxide.

At block 814, a trench side of the second wafer is bonded to an oxide layer of a third silicon wafer, such as a silicon on insulator (SOI) wafer, to make an interposer.

At block 816, the first wafer with the optical conduit is bonded to the interposer after alignment to make an integrated waveguide of silicon, including direct oxide-to-oxide-bonding of the first oxide in the recess of the first wafer to at least the second oxide in the trench of the second wafer.

In the specification and following claims: the terms "connect," "connection," "connected," "in connection with," and "connecting," are used to mean "in direct connection with" or "in connection with via one or more elements." The terms "couple," "coupling," "coupled," "coupled together," and "coupled with," are used to mean "directly coupled together" or "coupled together via one or more elements."

While the present disclosure has been disclosed with respect to a limited number of embodiments, those skilled in the art, having the benefit of this disclosure, will appreciate numerous modifications and variations possible given the description. It is intended that the appended claims cover such modifications and variations as fall within the true spirit and scope of the disclosure.

The invention claimed is:

1. An apparatus, comprising:
    an optical element comprising an optical trace and a first dielectric bonding surface;
    a first die comprising a second dielectric bonding surface bonded to the first dielectric bonding surface, and wherein the first die is made at least in part of a semiconductor material;
    a second die comprising a third dielectric bonding surface bonded to the first dielectric bonding surface, the optical trace providing optical communication between the first and second dies;
    a first dielectric direct bond between the first dielectric bonding surface and the first die; and
    a second dielectric direct bond between the first dielectric bonding surface and the second die.

2. The apparatus of claim 1, wherein the first dielectric direct bond comprises an oxide-to-oxide bond formed at room temperature or at a temperature near or below room temperature.

3. The apparatus of claim 1, wherein the optical trace comprises one of an optically transparent material, a photonic material, or a semiconductor material, and the first dielectric direct bond is optically transparent, at least in part.

4. The apparatus of claim 1, wherein the optical trace transmits a light or an electromagnetic radiation between the first die and the second die.

5. The apparatus of claim 4, wherein the optical trace is direct oxide bonded to the first die and to the second die.

6. The apparatus of claim 4, wherein the optical trace provides an optical path between the first die and the second die in an absence of an optical coupler.

7. The apparatus of claim 1, wherein the optical trace comprises a rib member of an optical waveguide, the rib member direct bonded to the first die to make the optical waveguide, wherein the optical waveguide comprises the rib member, the first dielectric direct bond, and the semiconductor material of the first die.

8. The apparatus of claim 1, wherein the optical trace comprises a rib member of an optical waveguide, the rib member direct bonded to a substrate, wherein the substrate is at least partly optically transparent, and wherein the optical waveguide comprises the rib member, the first dielectric direct bond, and the substrate.

9. The apparatus of claim 1, wherein the optical trace is direct bonded to a substrate and to multiple dies, and wherein the optical trace provides a continuous waveguide, an optical bus, and an unbroken optical pathway between the multiple dies.

10. The apparatus of claim 1, wherein the optical trace is bonded to the first die, and the first die comprises an optoelectronic chip comprising an optical conduit.

11. The apparatus of claim 10, wherein a composition of an inner core of the optical conduit is selected from a group consisting of Si, $ZrO_2$, $HfO_2$, $TiO_2$, $LiNbO_3$, $Nb_2O_5$, $SrTiO_3$, and ZnS.

12. The apparatus of claim 1, further comprising a second optical trace bonded to the first die.

13. The apparatus of claim 1, wherein the optical trace is formed in an optically-enabled interposer.

14. The apparatus of claim 1, wherein the optical trace comprises a rectangular waveguide.

15. The apparatus of claim 1, wherein the optical element is an interposer.

16. The apparatus of claim 1, wherein the first die is bonded to the optical trace at a first side of the optical element, and wherein the second die is bonded to the optical trace at the first side of the optical element.

17. The apparatus of claim 1, further comprising a first set of electrical contacts at a first side of the optical element, a second set of electrical contacts at a second side of the first die, and at least one direct bond between the first set of electrical contacts and the second set of electrical contacts.

* * * * *